United States Patent
Lucas et al.

(10) Patent No.: US 10,572,230 B2
(45) Date of Patent: Feb. 25, 2020

(54) EFFICIENT STATE MACHINES FOR REAL-TIME DATAFLOW PROGRAMMING

(71) Applicant: FogHorn Systems, Inc., Mountain View, CA (US)

(72) Inventors: Jason Lucas, Renton, WA (US); Abhishek Sharma, Mountain View, CA (US)

(73) Assignee: FogHorn Systems, Inc., Sunnyvale, CA (US)

( * ) Notice: Subject to any disclaimer, the term of this patent is extended or adjusted under 35 U.S.C. 154(b) by 273 days.

(21) Appl. No.: 15/467,306

(22) Filed: Mar. 23, 2017

(65) Prior Publication Data

US 2017/0277560 A1  Sep. 28, 2017

Related U.S. Application Data

(60) Provisional application No. 62/312,106, filed on Mar. 23, 2016, provisional application No. 62/312,187, (Continued)

(51) Int. Cl.
*G06F 9/46* (2006.01)
*G06F 8/35* (2018.01)
(Continued)

(52) U.S. Cl.
CPC ............... *G06F 8/35* (2013.01); *G06F 8/31* (2013.01); *G06F 8/34* (2013.01); *G06F 8/40* (2013.01);
(Continued)

(58) Field of Classification Search
None
See application file for complete search history.

(56) References Cited

U.S. PATENT DOCUMENTS

| 4,975,865 A | 12/1990 | Carrette et al. |
| 6,725,287 B1 | 4/2004 | Loeb et al. |

(Continued)

FOREIGN PATENT DOCUMENTS

| CN | 101860978 | 10/2010 |
| CN | 103024059 | 4/2013 |
| CN | 103200249 | 7/2013 |

OTHER PUBLICATIONS

Privat et al. Edge-of-Cloud Fast-Data Consolidation for the Internet of Things, 19th International ICIN Conference—Innovations in Clouds, Internet and Networks—Mar. 1-3, 2016, pp. 226-233. (Source: http://dl.ifip.org/db/conf/icin/icin2016/1570229504.pdf).

(Continued)

*Primary Examiner* — Diem K Cao
(74) *Attorney, Agent, or Firm* — Aka Chan LLP

(57) ABSTRACT

An efficient state-machine-based pattern matching technique processes tokens in an input queue and identifies patterns in the sequence of tokens that match one or more predetermined input patterns without backtracking. Tokens can include data or no data and a time component. The tokens can be a stream of data generated by a sensor, which transforms a physical property into a digital quantity. The pattern matching technique processes the input queue in a single direction, and does not examine any previously examined token. In an implementation, specific patterns to be matched are specified using a state machine, where the state machine is specified in a state table and operates using a state stack.

24 Claims, 11 Drawing Sheets

Related U.S. Application Data filed on Mar. 23, 2016, provisional application No. 62/312,223, filed on Mar. 23, 2016, provisional application No. 62/312,255, filed on Mar. 23, 2016.

(51) Int. Cl.

| | | |
|---|---|---|
| *G06F 8/30* | (2018.01) | |
| *G06F 8/34* | (2018.01) | |
| *G06F 8/40* | (2018.01) | |
| *G06F 11/36* | (2006.01) | |
| *G06F 16/9535* | (2019.01) | |
| *G06F 9/448* | (2018.01) | |
| *G06F 9/48* | (2006.01) | |

(52) U.S. Cl.
CPC .............. *G06F 9/4498* (2018.02); *G06F 9/48* (2013.01); *G06F 11/3664* (2013.01); *G06F 11/3668* (2013.01); *G06F 16/9535* (2019.01)

(56) References Cited

U.S. PATENT DOCUMENTS

| | | | |
|---|---|---|---|
| 8,572,155 B2 | 10/2013 | Yanovich et al. | |
| 2003/0035582 A1 | 2/2003 | Linhart | |
| 2005/0182800 A1* | 8/2005 | Ashwin | G06F 16/252 |
| 2007/0250299 A1 | 10/2007 | Paxson et al. | |
| 2009/0106011 A1 | 4/2009 | Chen et al. | |
| 2011/0004863 A1 | 1/2011 | Feblowitz et al. | |
| 2013/0110745 A1* | 5/2013 | Zhang | G06Q 10/00 706/12 |
| 2013/0144814 A1 | 6/2013 | Klinger et al. | |
| 2014/0047107 A1* | 2/2014 | Maturana | H04L 43/04 709/224 |
| 2014/0359552 A1* | 12/2014 | Misra | H04L 67/12 717/100 |
| 2015/0161214 A1 | 6/2015 | Kali et al. | |
| 2015/0381712 A1* | 12/2015 | de Castro Alves | G06F 16/24568 709/201 |

OTHER PUBLICATIONS

International Search Report, PCT Application PCT/US2017/023906, dated Jul. 27, 2017, 3 pages.

Mohammad Aazam, Eui-Nam Huh, Fog Computing and Smart Gateway Based Communication for Cloud of Things, 2014 International Conference on Future Internet of Things and Cloud, Aug. 31, 2014, pp. 464-470, IEEE, https://pdfs.semanticscholar.org/aa8a/6894735dc32aa7212ab7606ccd6d6e7338b9.pdf.

\* cited by examiner

EFFICIENT STATE MACHINES FOR REAL-TIME DATAFLOW PROGRAMMING

CROSS-REFERENCE TO RELATED APPLICATIONS

This patent application claims the benefit of U.S. patent applications 62/312,106, 62/312,187, 62/312,223, and 62/312,255, filed Mar. 23, 2016, which are incorporated by reference along with all other references cited in this application.

BACKGROUND OF THE INVENTION

The invention relates to the field of computing, and more specifically to efficient state machines for real-time dataflow programming, which may be used in edge computing to handle the large amounts of data generated by industrial machines.

Traditional enterprise software application hosting has relied on datacenter or "cloud" infrastructure to exploit economies of scale and system efficiencies. However, these datacenters can be arbitrarily distant from the points of physical operations (e.g., factories, warehouses, retail stores, and others), where the enterprise conducts most of its business operations. The industrial Internet of things (IIoT) refers to a collection of devices or use-cases that relies on instrumentation of the physical operations with sensors that track events with very high frequency.

Industrial machines in many sectors com under this Internet of things (IoT) including manufacturing, oil and gas, mining, transportation, power and water, renewable energy, health care, retail, smart buildings, smart cities, and connected vehicles. Despite the success of cloud computing, there are number of shortcomings: It is not practical to send all of that data to cloud storage because connectivity may not always be there, bandwidth is not enough, variation in latencies is too high, or it is cost prohibitive even if bandwidth exists. Even if connectivity, bandwidth, and cost are not issues, there is no real-time decision making and predictive maintenance that can result in significant damage to the machines.

Therefore, improved computing systems, architectures, and techniques including improved edge analytics and more efficient state machines for real-time dataflow programming are needed to handle the large amounts of data generated by industrial machines.

BRIEF SUMMARY OF THE INVENTION

An efficient state-machine-based pattern matching technique processes tokens in an input queue and identifies patterns in the sequence of tokens that match one or more predetermined input patterns without backtracking. Tokens can include data or no data and a time component. The tokens can be a stream of data generated by a sensor, which transforms a physical property into a digital quantity. The pattern matching technique processes the input queue in a single direction, and does not examine any previously examined token. In an implementation, specific patterns to be matched are specified using a state machine, where the state machine is specified in a state table and operates using a state stack.

In a specific implementation, the pattern matching technique is used in an edge computing system; a method that enables intelligence at the edge. Features include: triggering by sensor data in a software layer hosted on either a gateway device or an embedded system. Software layer is connected to a local-area network. A repository of services, applications, and data processing engines is made accessible by the software layer. Matching the sensor data with semantic descriptions of occurrence of specific conditions through an expression language made available by the software layer. Automatic discovery of pattern events by continuously executing expressions. Intelligently composing services and applications across the gateway device and embedded systems across the network managed by the software layer for chaining applications and analytics expressions. Optimizing the layout of the applications and analytics based on resource availability. Monitoring the health of the software layer. Storing of raw sensor data or results of expressions in a local time-series database or cloud storage. Services and components can be containerized to ensure smooth running in any gateway environment.

Edge intelligence is enabled at the source of the Internet of things (IoT) data. A system provides enriched access (stream or batch modes, or both) to IoT device sensor data for real-time edge analytics and applications. The system includes a highly efficient and expressive computer language for executing analytical functions and expressions, through a high performance analytics engine that operates in low memory footprint machines. The system allows publishing of aggregate data to cloud to further machine learning. The system includes a software development kit for developing edge apps. A cloud-based management console allows managing of edge deployments, configuration, applications, and analytics expressions.

A specific implementation of an edge infrastructure and platform is by FogHorn Systems, Inc. (FogHorn). The FogHorn Web site, www.foghorn-systems.com, publications (including white papers, user guides, tutorials, videos, and others), and other publications about FogHorn technology and products are incorporated by reference.

FogHorn provides a platform to enable edge intelligence for industrial and commercial internet of things (IoT) data. The amount of data generated by tens of billions of industrial and commercial IoT devices will be massive enough to overwhelm the entire Internet. The FogHorn platform processes, analyzes, and responds to IoT data right where it originates—at the edge of the network. FogHorn's "intelligent edge" software platform enables unprecedented levels of automation, operational efficiency, cost savings, and much more.

The Industrial Internet of Things (IIoT) consists of interconnected industrial and commercial devices such as sensors, machinery, and computers. The goal of IIoT is to enable greater device control, data management, machine automation, and operational efficiency across a distributed enterprise. Companies can apply fog computing at the edge to capture greenfield IIoT opportunities using real-time analytics and automated responses while also leveraging cloud computing for system-wide management and optimization. FogHorn edge computing platform is also designed to run in existing programmable logic controllers (PLCs) (e.g., Brownfield opportunities) if adding additional computing resources is not viable. Brownfield refers to an implementation of new systems to resolve information technology (IT) problem areas while accounting for established systems. New software architecture takes into account existing and running software.

Edge intelligence platform is a software-based solution based on fog computing concepts which extends data processing and analytics closer to the edge where the IIoT devices reside. Maintaining close proximity to the edge devices rather than sending all data to a distant centralized cloud, minimizes latency allowing for maximum performance, faster response times, and more effective maintenance and operational strategies. It also significantly reduces overall bandwidth requirements and the cost of managing widely distributed networks.

Focusing on IIoT operations at the edge reduces overall bandwidth requirements and enables immediate automated responses to time-sensitive conditions. The industrial world is adding billions of new IIoT devices and collectively these devices generate many petabytes of data each day. Sending all of this data to the cloud is not only very cost prohibitive but it also creates a greater security risk. Operating at the edge ensures much faster response times, reduced risks, and lower overall costs.

U.S. patent applications 62/210,981, filed Aug. 27, 2015, and Ser. No. 15/250,720, filed Aug. 29, 2016, are incorporated by reference and describe an edge computing environment and platform. U.S. patent application Ser. No. 15/467,313, filed Mar. 23, 2017, is incorporated by reference and describes a composition of pattern-driven reactions in real-time dataflow programming. U.S. patent application Ser. No. 15/467,318, filed Mar. 23, 2017, is incorporated by reference and describes tools and methods for real-time dataflow programming language.

In an implementation, a method includes: receiving a data stream from a sensor (e.g., hardware device that monitors a physical quantity and transforms the monitored physical quantity into the data stream in digital form); storing the data stream in an input queue (e.g., FIFO memory), where each token includes the data of a data stream (or no data) stored along with a time stamp of when the data is received; identifying patterns in the data stream that match one or more predetermined patterns by reading tokens through the input queue in a single direction, and not rereading any previously read tokens; and upon identifying a predetermined pattern in the data stream, outputting a positive indication in the output queue that the predetermined pattern has been identified.

In another implementation, a system includes: An input queue including memory locations in a computer memory organized as FIFO memory, where the input queue stores tokens to be processed where each token includes data (or no data) and a time stamp of when the token entered the input queue. A driver component that processes the tokens in the input queue without backtracking and identifies patterns in the sequence of tokens that match one or more predetermined input patterns, and upon identifying a matched predetermined input pattern, generates an outgoing event output. An output queue, including memory locations in the computer memory organized as a FIFO memory, where the output queue stores a sequence of the outgoing events generated by the driver component. A state table component that stores the predetermined input patterns in a state table format. A state stack component including third memory locations in the computer memory organized as LIFO memory with stack frames including a translation state number, a symbol, or a deadline, or any combination.

In another implementation, a method includes: Providing an input queue including first memory locations in a computer memory organized as FIFO memory where the input queue stores tokens to be processed where each token includes data (or data) and a time stamp of when the token entered the input queue. Providing driver component where the driver component processes the tokens in the input queue without backtracking and identifies patterns in the sequence of tokens that match one or more predetermined input patterns, and upon identifying a matched predetermined input pattern, generates an outgoing event output. Providing an output queue including second memory locations in the computer memory organized as FIFO memory, where the output queue stores the outgoing events generated by the driver component. Providing a state table component that stores the predetermined input patterns in a state table format. Providing a state stack component (e.g., LIFO memory) that stores stack frames.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
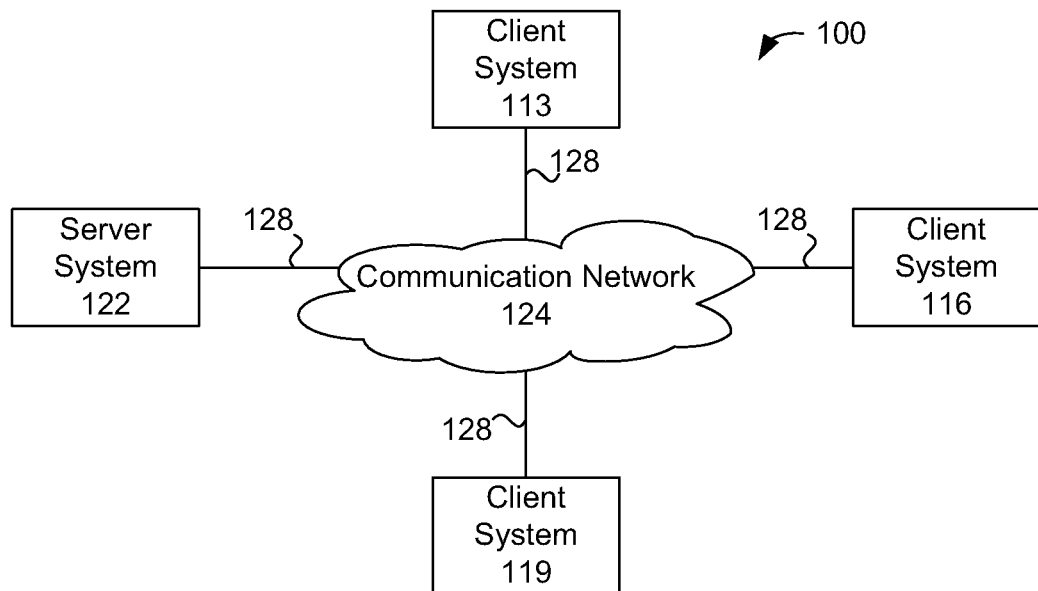
FIG. 1 shows a block diagram of a client-server system and network.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
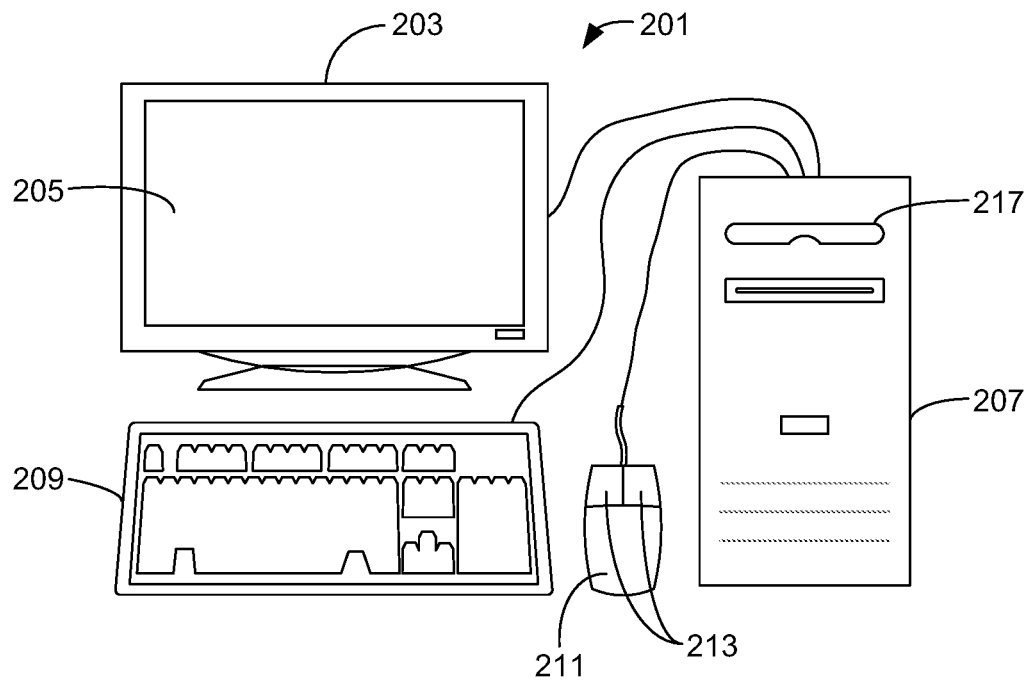
FIG. 2 shows a more detailed diagram of a client or server.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
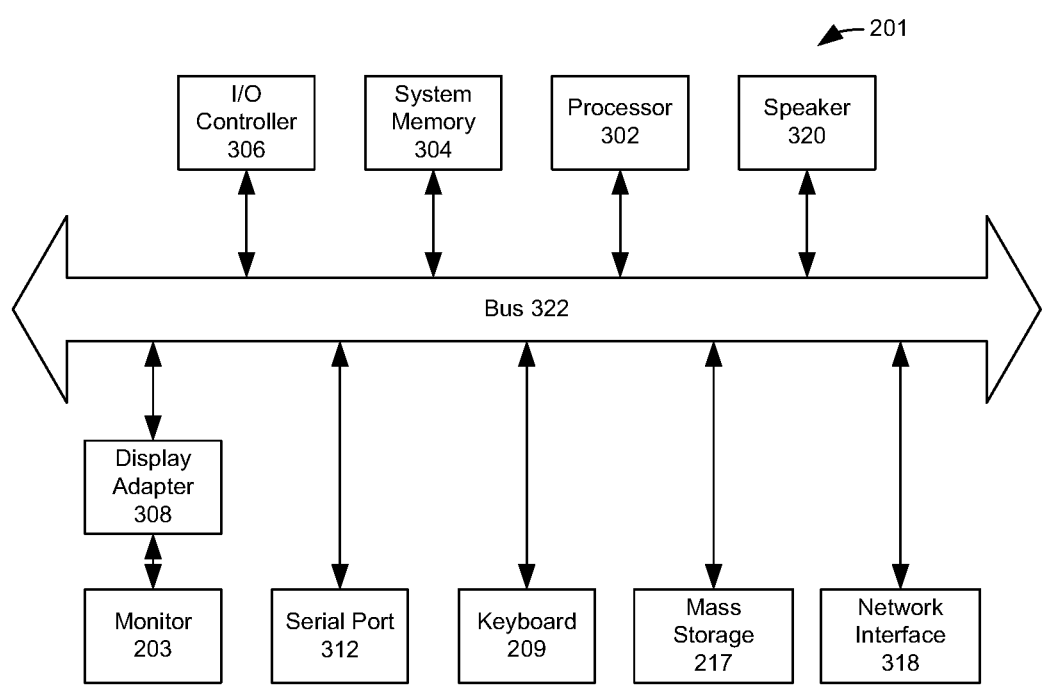
FIG. 3 shows a system block diagram of a computer system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.athworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, ixRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Figure 4:
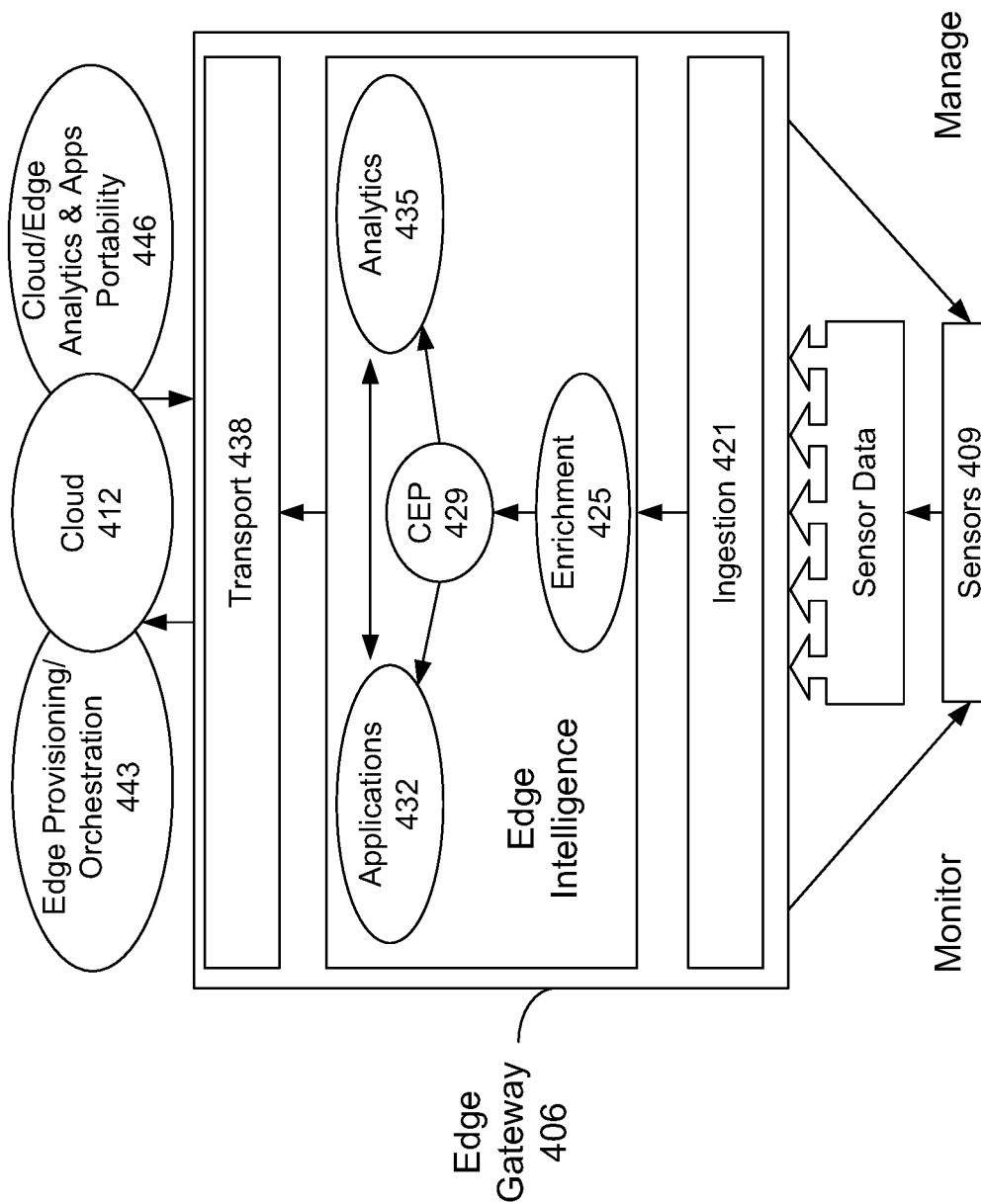
FIG. 4 a block diagram of an edge computing platform, which is between sensor streams and the cloud.

FIG. 4 shows a block diagram of an edge computing platform 406 typically running on an edge gateway or equivalent that is between sensors 409 and cloud 412. The edge computing platform enables deriving edge intelligence that is important for managing and optimizing industrial machines and other industrial Internet of things. Components of the edge gateway include the following: ingestion 421, enrichment 425, complex event processing (CEP) engine 429, applications 432, analytics through an expression language 435, and transport 438. The cloud can include edge provisioning and orchestration 443 and cloud and edge analytics and apps portability 446.

As discussed above, a specific implementation of an edge computing platform is from FogHorn. FogHorn is a leader in the rapidly emerging domain of "edge intelligence." By hosting high performance processing, analytics, and heterogeneous applications closer to control systems and physical sensors, FogHorn's breakthrough solution enables edge intelligence for closed loop device optimization. This brings big data and real-time processing on-site for industrial customers in manufacturing, oil and gas, power and water, transportation, mining, renewable energy, smart city, and more. FogHorn technology is embraced by the world's leading industrial Internet innovators and major players in cloud computing, high performance edge gateways, and IoT systems integration.

Foghorn provides: Enriched IoT device and sensor data access for edge apps in both stream and batch modes. Highly efficient and expressive DSL for executing analytical functions. Powerful miniaturized analytics engine that can run on low footprint machines. Publishing function for sending aggregated data to cloud for further machine learning. SDK (polyglot) for developing edge apps. Management console for managing edge deployment of configurations, apps, and analytics expressions.

FogHorn provides an efficient and highly scalable edge analytics platform that enables real-time, on-site stream processing of sensor data from industrial machines. The FogHorn software stack is a combination of services that run on the edge and cloud.

An "edge" solutions may support ingesting of sensor data into a local storage repository with the option to publish the unprocessed data to a cloud environment for offline analysis. However many industrial environments and devices lack Internet connectivity making this data unusable. But even with Internet connectivity, the sheer amount of data generated could easily exceed available bandwidth or be too cost prohibitive to send to the cloud. In addition, by the time data is uploaded to the cloud, processed in the data center, and the results transferred back to the edge, it may be too late to take any action.

The FogHorn solution addresses this problem by providing a highly miniaturized complex event processing (CEP) engine, also known as an analytics engine, and a powerful and expressive domain specific language (DSL) to express rules on the multitude of the incoming sensor streams of data. Output from these expressions can then be used immediately to prevent costly machine failures or downtime as well as improve the efficiency and safety of industrial operations and processes in real time.

The FogHorn platform includes: Ability to run in low footprint environments as well as high throughput or gateway environments. Highly scalable and performant CEP engine that can act on incoming streaming sensor data. Heterogeneous app development and deployment on the edge with enriched data access. Application mobility across the cloud and edge. Advanced machine learning (ML) and model transfer between cloud and edge. Out of the box, FogHorn supports the major industrial data ingestion protocols (e.g. OPC-UA, Modbus, MQTT, DDS, and others) as well as other data transfer protocols. In addition, users can easily plug-in custom protocol adaptors into FogHorn's data ingestion layer.

FogHorn edge services operate at the edge of the network where the IIoT devices reside. The edge software stack is responsible for ingesting the data from sensors and industrial devices onto a high speed data bus and then executing user-defined analytics expressions on the streaming data to gain insights and optimize the devices. These analytical expressions are executed by FogHorn's highly scalable and small footprint complex event processing (CEP) engine.

FogHorn edge services also include a local time-series database for time-based sensor data queries and a polyglot SDK for developing applications that can consume the data both in stream and batch modes. Optionally, this data can also be published to a cloud storage destination of the customer's choice.

The FogHorn platform also includes services that run in the cloud or on-premises environment to remotely configure and manage the edges. FogHorn's cloud services include a management UI for developing and deploying analytics expressions, deploying applications to the edge using an application known as Docker (www.docker.com), and for managing the integration of services with the customer's identity access management and persistence solutions. The platform will also be able to translate machine learning models developed in the cloud into sensor expressions that can be executed at the edge.

As examples, an application applies real-time data monitoring and analysis, predictive maintenance scheduling, and automated flow redirection to prevent costly damage to pumps due to cavitation events. Another example is wind energy management system using FogHorn edge intelligence software to maximize power generation, extend equipment life, and apply historical analysis for accurate energy forecasting.

Figure 5:
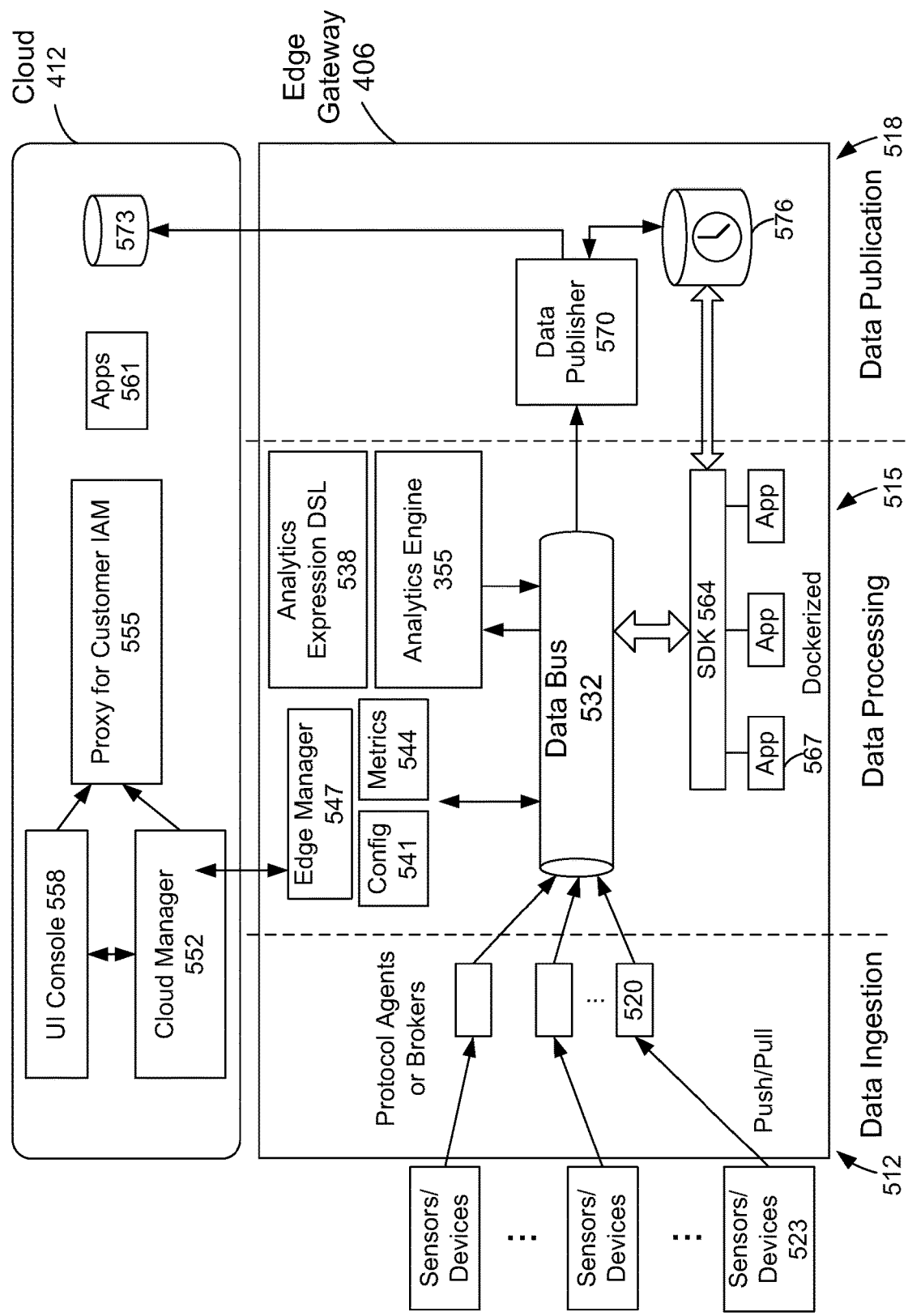
FIG. 5 shows a more detailed block diagram of an edge computing platform including edge analytics.

FIG. 5 shows a more detailed block diagram of an edge computing platform. This platform has three logical layers or sections, data ingestion 512, data processing 515, and data publication 518. The data ingestion components include agents 520 that are connected to sensors or devices 523 that generate data. The agents collect or ingest data from the sensors via one or more protocols from the respective protocol servers. The agents can be clients or brokers for protocols such as, among others, MQTT, OPC UA, Modbus, and DDS. The data provided or output by the sensors is typically a binary data stream. The transmission or delivery of this data from the sensors to the agents can be by push or pull methods.

Push describes a style of communication where the request for a given transaction is initiated by the sender (e.g., sensor). Pull (or get) describes a style of communication where the request for the transmission of information is initiated by receiver (e.g., agent). Another communication technique is polling, which the receiver or agent periodically inquires or checks the sensor has data to send.

MQTT (previously MQ Telemetry Transport) is an ISO standard publish-subscribe-based "lightweight" messaging protocol for use on top of the TCP/IP protocol. Alternative protocols include the Advanced Message Queuing Protocol, the IETF Constrained Application Protocol, XMPP, and Web Application Messaging Protocol (WAMP).

OPC Unified Architecture (OPC UA) is an industrial M2M communication protocol for interoperability developed by the OPC Foundation. It is the successor to Open Platform Communications (OPC).

Modbus is a serial communications protocol originally published by Modicon (now Schneider Electric) in 1979 for use with its programmable logic controllers (PLCs). Simple and robust, it has since become for all intents and purposes a standard communication protocol. It is now a commonly available means of connecting industrial electronic devices.

Data processing 515 includes a data bus 532, which is connected to the agents 520 of the data ingestion layer. The data bus is the central backbone for both data and control messages between all connected components. Components subscribe to the data and control messages flowing through the data bus. The analytics engine 535 is one such important component. The analytics engine performs analysis of the sensor data based on an analytic expressions developed in expression language 538. Other components that connect to the data bus include configuration service 541, metrics service 544, and edge manager 547. The data bus also includes a "decoder service" that enriches the incoming data from the sensors by decoding the raw binary data into consumable data formats (such as JSON) and also decorating with additional necessary and useful metadata. Further, enrichment can include, but is not limited to, data decoding, metadata decoration, data normalization, and the like.

JSON (sometimes referred to as JavaScript Object Notation) is an open-standard format that uses human-readable text to transmit data objects consisting of attribute-value pairs. JSON is a common data format used for asynchronous browser or server communication (AJAJ) or both. An alternative to JSON is XML, which is used by AJAX.

The edge manager connects to cloud 412, and in particular to a cloud manager 552. The cloud manager is connected to a proxy for customer identity and access management (IAM) 555 and user interface console 558, which are also in the cloud. There are also apps 561 accessible via the cloud. Identity and access management is the security and business discipline that enables the right individuals to access the right resources at the right times and for the right reasons.

Within data processing 515, a software development kit (SDK) 564 component also connects to the data bus, which allows the creation of applications 567 that work that can be deployed on the edge gateway. The software development kit also connects to a local time-series database to fetch the data. The applications can be containerized, such as by using a container technology such as Docker.

Docker containers wrap up a piece of software in a complete file system that contains everything it needs to run: code, runtime, system tools, and system libraries—anything that can be installed on a server. This ensures the software will always run the same, regardless of the environment it is running in.

Data publication 518 includes a data publisher 570 that is connected to a storage location 573 in the cloud. Also, applications 567 of the software development kit 564 can access data in a time-series database 576. A time-series database (TSDB) is a software system that is optimized for handling time series data, arrays of numbers indexed by time (e.g., a date-time or a date-time range). The time-series database is typically a rolling or circular buffer or queue, where as new information is added to the database, the oldest information is being removed. A data publisher 570 also connects to the data bus and subscribes to data that needs to be stored either in the local time-series database or in the cloud storage.

Figure 6:
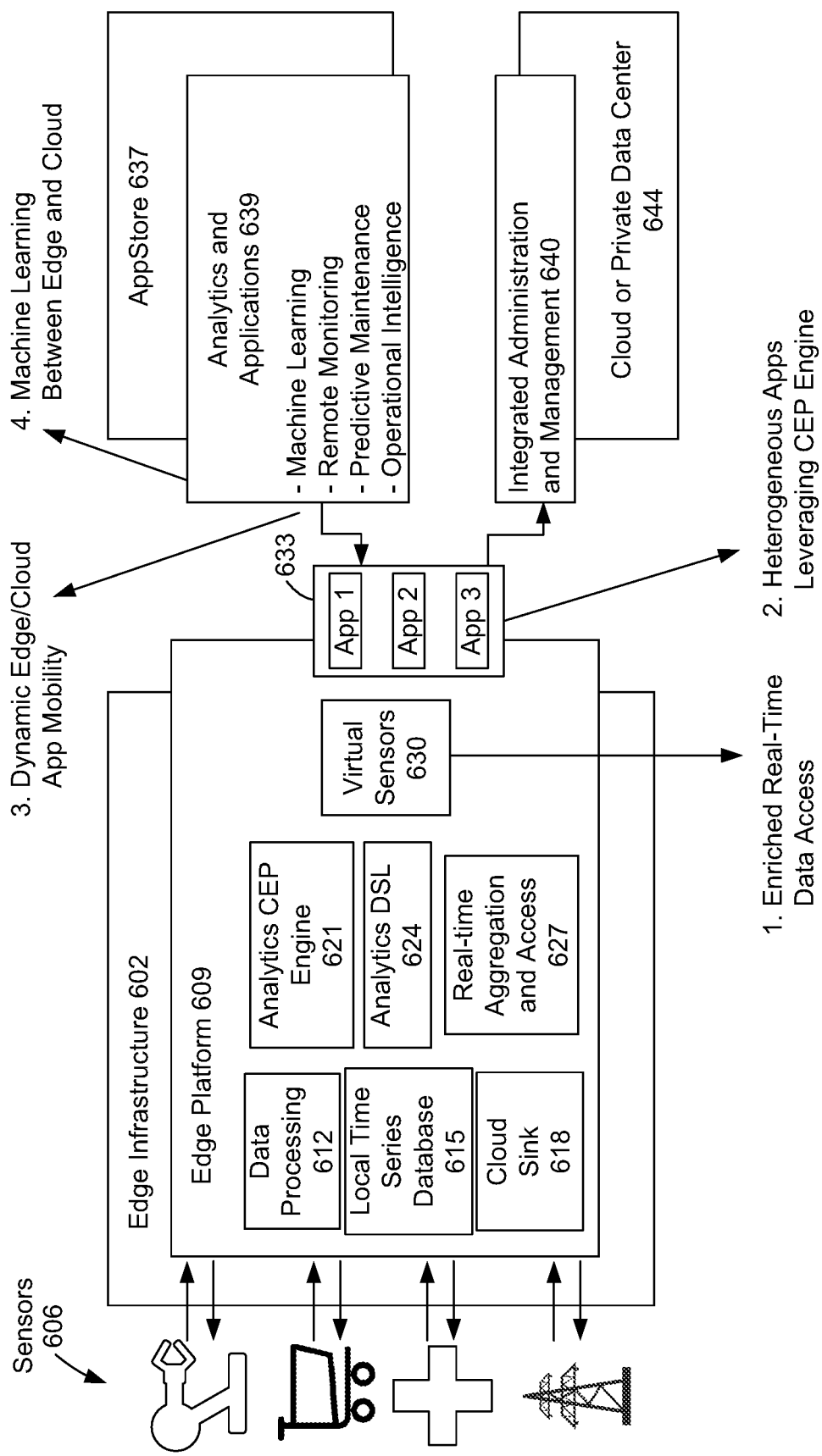
FIG. 6 shows an operational flow between edge infrastructure and cloud infrastructure.

FIG. 6 shows an operational flow between edge 602 and cloud infrastructures. Some specific edge infrastructures were described above. Data is gathered from sensors 606. These sensors can be for industrial, retail, health care, or medical devices, or power or communication applications, or any combination of these.

The edge infrastructure includes a software platform 609, which has data processing 612, local time-series database 615, cloud sink 618, analytics complex event processing engine (CEP) 621, analytics real-time streaming domain-specific language (DSL) 624 (e.g., the Vel language by Foghorn), and real-time aggregation and access 627. The platform can include virtual sensors 630, which are described below in more detail. The virtual sensors provide enriched real-time data access.

The platform is accessible via one or more apps 633, such as apps or applications 1, 2, and 3, which can be developed using a software development kit or SDK. The apps can be heterogeneous (e.g., developed in multiple different languages) and leverage complex event processing engine 621, as well as perform machine learning. The apps can be distributed using an app store 637, which may be provided by the edge platform developer or the customer of the edge platform (which may be referred to as a partner). Through the app store, users can download and share apps with others. The apps can perform analytics and applications 639 including machine learning, remote monitoring, predictive maintenance, or operational intelligence, or any combination of these.

For the apps, there is dynamic app mobility between edge and cloud. For example, applications developed using the FogHorn software development kit can either be deployed on the edge or in the cloud, thereby achieving app mobility between edge and cloud. The apps can be used as part of the edge or as part of the cloud. In an implementation, this feature is made possible due to the apps being containerized, so they can operate independent of the platform from which they are executed. The same can be said of the analytics expressions as well.

There are data apps that allow for integrated administration and management 640, including monitoring or storing of data in the cloud or at a private data center 644.

A physical sensor is an electronic transducer, which measures some characteristics of its environment as analog or digital measurements. Analog measurements are typically converted to digital quantities using analog to digital converters. Sensor data are either measured on need based (polled) or available as a stream at a uniform rate. Typical sensor specifications are range, accuracy, resolution, drift, stability, and other attributes. Most measurement systems and applications utilize or communicate the sensor data directly for processing, transportation, or storage.

The system has a "programmable software-defined sensor," also called a virtual sensor, which is a software based sensor created using an analytics expression language. In an implementation, the analytics expression language is FogHorn's analytics expression language. This expression language is known as Vel. The Vel language is implemented efficiently to support real-time streaming analytics in a constrained low footprint environment with low latencies of execution. For example, a latency of the system can be about 10 milliseconds or less.

In an implementation, the programmable software-defined sensor is created with a declarative application program interface (API) called a "sensor expression language" or SXL. A specific implementation of an SXL language is Vel from FogHorn. An Vel-sensor is a Vel-sensor created through this construct, and provides derived measurements from processing data generated by multiple sources including physical and Vel-sensors. In this application, Vel and SXL are used interchangeably.

A Vel sensor can be derived from any one of or a combination of these three sources:

1. A single sensor data.

1.1. A virtual or Vel sensor derived from a single physical sensor could transform the incoming sensor data using dynamic calibration, signal processing, math expression, data compaction or data analytics, of any combination.

2. Multiple physical sensor data.

2.1. A virtual or Vel sensor or derived as a transformation (using the methods described above) from multiple heterogeneous physical sensors.

3. A combination of physical sensor data and virtual sensor data made available to the implementation of the Vel-sensor apparatus.

Vel sensors are domain-specific and are created with a specific application in mind. A specific implementation of Vel programming interface enables applications to define data analytics through transformations (e.g., math expressions) and aggregations. Vel includes a set of mathematical operators, typically based on a programming language. Vel sensors operate at runtime on data by executing Vel constructs or programs.

Creation of Vel Sensors. Vel sensors are designed as software apparatus' to make data available in real-time. This requires the execution of applications developed with the Vel in real-time on embedded compute hardware to produce the Vel-sensor data at a rate required by the application. The system includes a highly efficient execution engine to accomplish this.

Benefits of Vel sensors include:

1. Programmability. Vel makes Vel sensors programmable to synthesize data to match specific application requirements around data quality, frequency and information. Vel-sensors can be widely distributed as over-the-air software upgrades to plug into data sourced from physical sensors and other (e.g., preexisting) Vel sensors. Thus application developers can create a digital infrastructure conducive to the efficient execution of business logic independent of the layout of the physical infrastructure.

2. Maintainability or Transparency. Vel-sensors create a digital layer of abstraction between applications and physical sensors, which insulates developers from changes in the physical infrastructure due to upgrades and services to the physical sensors.

3. Efficiency: Vel-sensors create efficiencies in information management by transforming raw data from physical sensors into a precise representation of information contained in them. This efficiency translates into efficient utilization of IT resources like compute, networking, and storage downstream in the applications.

4. Real-time data: Vel-sensors provide real-time sensor data that is computed from real-world or physical sensor data streams. This makes the data available for applications with minimum time delays.

Implementation. The system has architected a scalable, real-time implementation of Vel-sensors based on a Vel interface. Vel includes operators supported by Java language and is well integrated with physical sensors and their protocols.

The system brings a novel methodology for precisely expressing the operations on physical sensors' data to be executed. This declarative expression separates the definition of the digital abstraction from the implementation on the physical sensors.

Given a set of streams of data of varying types and a set of functions meant to react to and handle specific patterns of data in those streams, this invention is a technique to describe and translate those functions such that they can be invoked appropriately and efficiently as data arrives in the streams.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a match can be detected and a handler function applied is of utmost importance, and where there are limited storage and computing resources to devote to the execution.

EXAMPLE

From a given stream of integers, we wish to match one or more nonzero values, followed by one or more zeros. When this pattern has been matched, we wish to compute the sum of the nonzero values and write the result to another stream.

We could write the pattern-matching portion of this problem in a regular expression notation, and then separately write the computation of the sum as an expression of arithmetic. As it happens, the Vel programming language, designed for use in dataflow applications in edge computing, allows us to write the whole transform in a unified notation, thus:

```
stream("output") =
  ( a:{!= 0} .. {>0}, :0 .. {>0} -> sum(a) )
  from stream("input")
```

Figure 7:
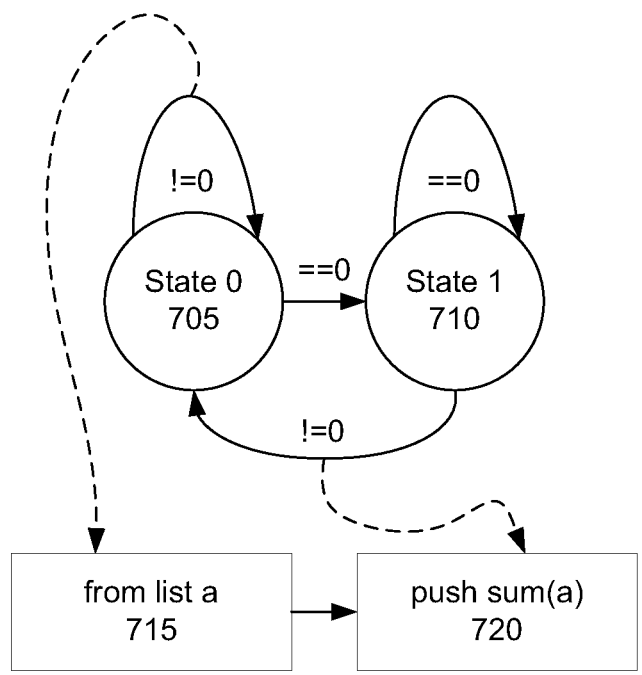
FIG. 7 shows an enhanced nondeterministic finite automaton (NFA) converted to a deterministic finite automaton (DFA) and state-reduced machine.

The technique would translate the above function parameterization into a state machine. It would then implement the match as a deterministic finite automaton based on that state machine, and feed the resulting matches to the summing expression. This flow is depicted in FIG. 7. This is a state 0 705, state 1 710, "from list a" block 715, and "push sum(a)" block 720.

This problem can be solved by generating a matching function for each handler function. The matching function accepts as input a window of data from the streams and returns true for a match and false for a nonmatch. As data flows through the windows, the matching functions must be applied repeatedly until a match is found. Once a match is found, the handler function is applied.

This solution arises because the handler functions are specified in a manner similar to that used for database queries. An SQL-like WHERE-clause provides a Boolean expression describing the conditions for match and the matching function is a direct compilation of this expression.

The separate matching functions must be evaluated individually as new data flows into the stream buffers. Matches are determined for each function independently.

Using a state machine to perform the match is more efficient than repeatedly applying multiple, arbitrary Boolean expressions.

The present invention derives a state machine from a pattern description language that declares the parameters of a function. The derived state machine more efficiently detects matches in a data stream than conventional Boolean expression matching functions.

The derived state machine may also implement a set of handler functions for matches detected in the data stream. Multiple matching and corresponding handler functions may be combined and reduced to a single state machine that efficiently recognizes matches for any handler function.

The derived state machine may also be augmented to include free (epsilon) transitions through additional nodes without altering the sequence recognized by the state machine.

Transitioning through such an additional node may trigger various actions on the data. For example, it may trigger collection of the data in the shift buffer of the deterministic finite automaton (DFA) or stack machine into a holding area. These data may later form the basis for arguments to function application.

This application uses the term DFA, but these automatons or units may be referred to stack machines. Strictly speaking, deterministic finite automaton implies finite performance in space. However, an automaton in this patent is not necessarily finite, but can be nonfinite, yet still simple. Therefore, the DFAs as described in this patent may be nonfinite.

Transitioning through such an additional node may also trigger the invocation of a handler function, using the data captured in prior nodes as function application arguments.

Translation from a script combining aspects of regular expressions and value expressions gives rise to an augmented state machine or DFA which can efficiently match patterns and compute values.

The resulting combined matching or computing algorithm is more efficient than separate organization of pattern matching and value computing.

A method for constructing the DFA or state machine from the lexical source, beginning with a nondeterministic finite automaton (NFA) and then reducing it to a minimal DFA. The purpose of the DFA is to recognize a pattern within series of input data. For the purposes of this discussion, we will call the data flowing through the state machine tokens and a particular pattern recognized by the DFA as a language of the tokens.

Figure 8:
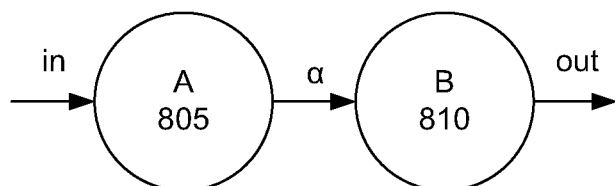
FIG. 8 shows a transition from state A to B upon receipt of the token alpha.

Consider the portion of the NFA in FIG. 8. This portion also happens to be a DFA, but this is not important for the purpose of this example. It transitions from state A 805 to state B 810 upon receipt of the token alpha.

Figure 9:
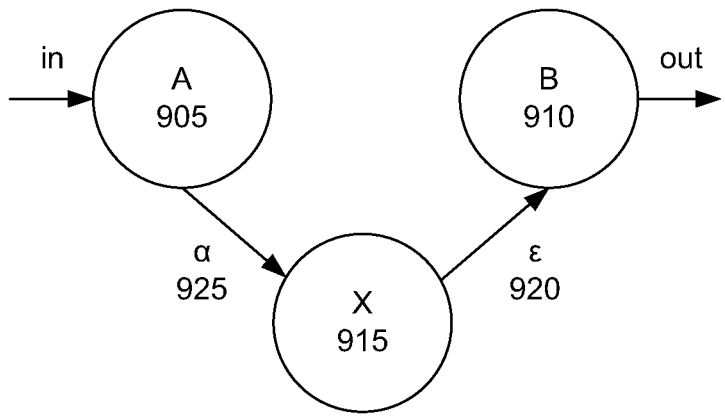
FIG. 9 shows a transition from state A to B through an extra state transition, state X.

We may augment this NFA by adding an additional node with an epsilon transition 920, as shown in FIG. 9. An epsilon edge may be followed at any time—for free, as it were—regardless of the state of input.

The presence of one or more epsilon edges make the state machine nondeterministic; however, epsilon edges may be removed by an algorithm, with the NFA reduced by this means to an equivalent DFA which can be implemented efficiently by a table-driven method. We can therefore introduce these extra epsilon transitions while still retaining a strategy for efficient implementation.

The state machine in FIG. 9 will transition from state A 905 to state X 915 upon receipt of token alpha 925, and can then proceed at will from state X to state B 910 at will. The impetus of alpha still results in a transition from state A to state B, just as it did in the simpler machine in FIG. 8, and no additional inputs are required to achieve this transition. It can therefore be seen that the NFA in FIG. 9 translates the same language that in FIG. 8. It simply takes an extra state transition, through state X, in order to do so.

The extra state is useful in that we may associate with it the performance of side-effects. So long as these side-effects alter neither the definition of the state machine nor the data flowing through the state machine, the additional node will have no effect on the recognition of language, but the side-effects can do additional work.

In a data flow reaction implementation, the additional work could include any number of useful actions on or using the data. In one exemplary implementation, the work can include:

1. Examining the data flowing through the node and emitting a copy of it to an outside collector;
2. Applying a transform to data as it flows through the node and collecting the transformed data and in a temporary buffer; OR
3. Flushing collected data from a temporary buffer into an additional transform and pushing the result to another DFA or stack machine.

As an example, let us consider the source fragment:
(a:{!=0} . . . {>0}, :0 . . . {>0}->sum(a))

The fragment describes a pattern consisting of two terms: (1) A first term, called a, which matches one or more recurrences of nonzero values. (2) A second term, not given a name, which matches one or more recurrences of zeros.

Let us suppose we wish to use this as the basis for a reaction. We will read values from a source called in, and when we recognize the fragment's pattern among the input, we will react by evaluating the fragment's right-hand side and pushing the result to a destination called out.

For example, if in consisted of the values [101, 202, 303, 0, 0], we would match the pattern by binding the first three values to a and the last two values to the anonymous second term. We would then evaluate the right-hand side by applying the sum function to the list of values bound to a, [101, 202, 303], returning 606. We would then push 606 to out.

The translation of a functional pattern such as in this example in accordance with this invention may be implemented via a computer-executed translation program. The program would have to perform two different forms of translation: translating the function-oriented portion "sum (a)" into a block of executable statements that would perform the computation, and translating the pattern-oriented portion "a: {!=0} . . . {>0}, :0 . . . {>0}" into a DFA or stack machine which would recognize the pattern, capture the arguments, and invoke the function. Let us call the former task function translation and the second task pattern translation.

Function translation is well understood by computer programmers who specialize in the writing of compilers and interpreters. Pattern translation, the fitting together of function translation and pattern translation, and the subsequent automation of pattern recognition and function dispatch, are the subjects of this invention.

Function translation consists of accepting a source text, breaking the text into tokens, and then, guided by a grammar, arranging the tokens such that they form the leaves of an abstract syntax tree (AST) which describes the syntactic content of the source text. The abstract syntax tree is then traversed by a series of algorithms which ultimately produce the blocks of instructions required to evaluate the functions described by the source.

Figure 10:
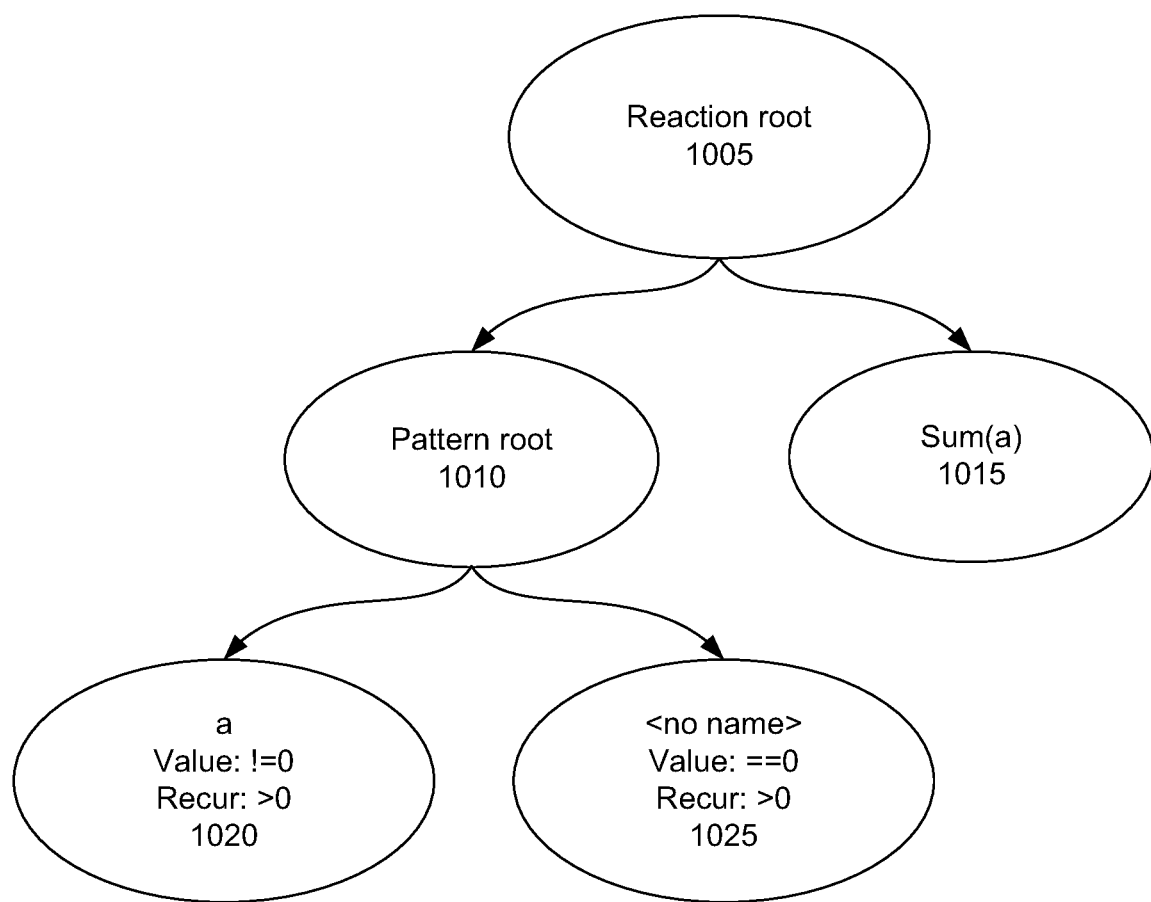
FIG. 10 shows an example of an abstract syntax tree formed by the syntactic analysis.

Pattern translation begins with the abstract syntax tree formed by the syntactic analysis described above. The abstract syntax tree will contain one or more nodes which form the roots of pattern declarations. For example, our pattern above might consist of a single root node with two children, each child describing one term of the pattern, as depicted in the lower-left portion of FIG. 10. In FIG. 10, there is a reaction root node 1005, pattern root node 1010, sum(a) node 1015, a node 1020, and <no name> node 10.

Recognize that a pattern term node, specifying as it does an example to match and a recurrence with which to match it, carries the same information as does a term in a regular expression. In addition, the sequence of child nodes, taken together and in order, specifies the same information as a linear conjunction of regular expression terms. A linear conjunction of regular expression or regular expression terms can be translated terms into an NFA. We have discovered the same algorithm can be used in the present invention, with pattern terms standing in for regular expression terms.

Once the basic NFA is so formed, we may inject into it our extra, side-effect-inducing states in positions where actions is required by pattern terms, and after the accepting state, to invoke reaction's function.

To continue our example, term a requires that we collect a list of the values which match it so we may eventually pass them as an argument to the reaction's function. We thus apply the transformation depicted in FIG. 9 to the NFA state resulting from term a and use the new state to do the work of collecting matching terms. We then apply the transformation again, this time to the NFA's accepting state, and use the collected values to call the reaction's function, push the result to the reaction's consumers, and clear the collection buffer. After this enhanced NFA is converted to a DFA and state-reduced, we are left with the machine depicted in FIG. 7.

The steps are used to convert an NFA to a DFA, to state-reduce a DFA, and to render a DFA as a state-action table, as is the algorithm for using a state-action table to drive a state-machine engine.

The NFA produced by a technique this invention can be transformed and rendered into a table. However, the resulting table includes an extra column consisting of the side-effect lambda to be executed when passing through each state. The automation engine that uses such a state-action-lambda table will, unlike other techniques, execute the additional lambda each time it undergoes a transition.

A method for describing and translating reactive functions for use data flow computing environments, includes: (i) identifying a reactive function; (ii) identifying the pattern of parameters providing inputs to the function; (iii) identifying the expression to be evaluated based on the arguments passed to the function; (iv) translating the pattern of parameters into a state machine capable of recognizing the sequences of input which match the pattern; (v) augmenting the state machine with additional states which do the work of collecting and transforming input data to prepare it for use as arguments to the function; and (vi) reducing the state machine to a state-action-effect table capable of automation by simple software or hardware.

Given a set of functions and a sequence of values as arguments, this invention is a method to dispatch execution to the function which the arguments match, or to determine that the arguments match none of the functions. This method is novel in that, by combining value expressions, type expressions, and regular expressions, it can match without ambiguity any sequence of values representable in the type system.

The need to solve this type of problem arises in the development of translators, interpreters, and compilers and is closely related to the notion of polymorphic dispatch. If one considers the elements forming an arbitrary prefix of the sequence to constitute single object (a tuple), then the task of dispatching to the correct function can be thought of as equivalent to the polymorphic dispatch of method of the tuple's class.

This invention is applicable to any situation in which a this sort of polymorphic dispatch is required. This includes all manner of event-driven or reactive programs which must respond to a stream of data originating from outside of the program. The invention will be particularly useful in applications relating to the real-time processing of multiple streams of data, such as often occurs in edge or fog computing or networking environments.

Regular expressions are commonly used to detect strings which conform to a particular pattern. There are a number of regular expression languages, most closely related, and many tools which implement efficient matching engines based on them. These are generally limited to matching sequences of characters.

There are other pattern-based notations, which operate on domains other than strings. One example is XPATH, which describes patterns in XML documents. These notations are often less complete and less powerful than regular expressions and are tailored for a specific domain.

Some programming languages implement runtime polymorphic dispatch by means of a type-based pattern matching system. Multiple overloads of a function are defined, each taking a different pattern of types and values, and dispatch is resolved at runtime by matching the types and values of the arguments against the patterns of the function parameters. Haskell is one such programming language.

Language-specification languages describe context-free grammars as a series production rules. These rules constitute the syntax of the language. A compiler-compiler translates these rules into a table-driven deterministic finite state machine which can recognize instances of the language. Bison is an example of such a language-specification language and its associated compiler-compiler.

Grammar-driven pattern-matching systems such as regular expressions have the benefit of efficient execution due to being representable as simple machines such as deterministic finite automata (DFAs) or state machines, but they lack the broad modeling capabilities of a full type system. Type-driven pattern-matching systems such as that used in Haskell have much richer modeling capabilities, but often sacrifice what is representable in favor of a reasonably efficient implementation, yet still are not as efficient as the high-speed matching systems based on DFAs.

This invention deals with a type-based matching system which can match against all states representable in among its types and yet may still be implemented efficiently as a state machine. A generalized pattern of types and states is translated into table-driven state machine which will efficiently recognize instances of the pattern.

Defining function parameters based on these patterns allows a function to match exactly any arbitrary pattern of data and, in matching, bind its arguments from among the matching data elements. The state machine describing the matching pattern for a union of functions is formed by merging the state machines of the member functions, then reducing the result to a minimal number of states. Disambiguation between overloads, or detection of an overall nonmatch, occurs as early as possible in a sequence, speeding the resolution of the function application. A match may also be delayed until as late as possible in a sequence, producing the "greedy" version of the function which will accept as much input as possible.

A method combines value expressions, type expressions, and regular expressions, such that it can match without ambiguity any sequence of values representable in the type system. This method resolves a function application and dispatches to the correct overload with a minimal number of decisions. This method allows an overloaded function application to perform the same work as context-free grammar, recognizing a specific language by recursively recognizing grammatical subcomponents and applying transformation functions thereto.

This method is applicable in connection with a type system including a plurality of different types, for example: (1) A set of foundational monomorphic types, such as integers, real numbers, and strings. (2) A set of polymorphic types and their constructors, in particular a polymorphic set type with certain properties we shall shortly discuss. (3) A sum type. (4) A product type in the form of a record. (5) A product type in the form of a pattern, which is a generalization of a tuple to including repetition of its fields. (6) A lambda type, which maps a pattern type to any type. (7) And, a poly-lambda type, consisting of a list of lambdas.

A set is a polymorphic type consisting of one or more ranges of elements. The set type is parameterized on the type of element it contains, such that a set of integers is a distinct type from a set of strings, for example. A set type is further characterized by limits on its contents. In particular, a set type may be constrained to be finite or infinite or to be closed or open on its left- or right-hand sides, or any combination of these. Consider the following examples of sets of integers:

TABLE A

| Notation | Length | Closedness | Meaning |
| --- | --- | --- | --- |
| [1] | 1 | closed on the left and right | A set consisting of the single integer 1. |
| [1, 2, 3] | 3 | closed on the left and right | A set consisting of three integers: 1, 2, and 3. |
| [5000 . . . 6000] | 1001 | closed on the left and right | The integers from 5000 to 6000, inclusive. |
| [10 . . . ] | infinite | closed on the left, open on the right | All the integers equal to or greater than 10. |
| [ . . . 10] | infinite | open on the left, closed on the right | All the integers less than or equal to 10. |
| [>5] | infinite | closed on the left, open on the right | All the integers greater than 5. The same as [6 . . . ]. |
| [>=5] | infinite | closed on the left, open on the right | All the integers greater than or equal to 5. The same as [5 . . . ]. |
| [<5] | infinite | open on the left, closed on the right | All the integers less than 5. The same as [ . . . 4]. |
| [<=5] | infinite | open on the left, closed on the right | All the integers less than or equal to 5. The same as [ . . . 5]. |
| [!=5] | infinite | open on the left and right | All the integers except 5. |
| [>=1] and [<=3] | 3 | closed on the left and right | A set consisting of three integers: 1, 2, and 3. The same as [1, 2, 3] or [1 . . . 3]. |
| [<=−10] or [>=10] | infinite | open on the left and right | All the integers with an absolute magnitude greater than or equal to 10. |
| not [1 . . . 3] | infinite | open on the left and right | All the integers except 1, 2, and 3. |

There is no distinction between [>=1] and [>0] because the elements are of integer type and integers are distinctly enumerable. If the elements were of a nonenumerable type, such as real numbers or strings, then the explicit inclusion or inclusion of a specific endpoint becomes necessary. For example, the set [>="cat"] consists of the string "cat" and of all strings which sort lexicographically after "cat."

We may use an instance of a set as a type. The instances of such a type must be members of the set. For example, the set [>0], used as a type, would allow only positive integers as values. In fact, one may think of all types in this way. For example, the monomorphic integer type could be considered a set type consisting of the set of all integers.

Our sum type is a simple union of other types. For example, the type int or string is the sum of its two constituent types. Any instance of any of a sum type's constituent types is also an instance of the sum type. This allows us, for example, to describe the type list(int or string), which is a list of values, each of which is either an integer or a string. The union of unions flattens, so that the type expression (int or string) or (int or real) is equivalent to int or real or string. The order of the types in a union is not important, but for the sake of a canonicality, we present all union types here such that their constituents are in alphabetical order.

Our record type uses named fields and associates each field with a type. For example: {birthday: date; first_name: string; last_name: string}. A record type always has a finite number of fields and each field has a name unique within the type. The order of fields isn't important; {x: int; y: int} is the same as {y: int; x: int}; however, as we did for unions, we will present record types with their constituents in alphabetical order.

Note that the type of a record is itself a record. The value {x: 3; y: 4} has the type {x: int; y: int}.

Our pattern type is similar to a tuple in that it is defined as a sequence of types; however, while a tuple implicitly assumes each of its elements appears exactly once, a pattern permits each of its elements to have a recurrence. The recurrence is given as a set of integers. For example, the pattern <a: int # [1 . . . 3]; b: string # [1 . . . 3]> matches one to three integers followed by one to three strings.

When used as the parameters of a lambda, the fields of a pattern give rise to arguments which are bound within the lambda's evaluation. For example, after we matched the pattern given in the previous paragraph, we would have two local identifiers, a and b, in scope. The value of A would be a list of one to three integers and the value of b would be a list of one to three strings.

It is also valid for one or more fields in a pattern to have no name. A field with no name is matched but no value for it is bound as an argument. For example, if we matched <a: int # [1 . . . 3]; string # [1 . . . 3]>, we would match as before—one to three integers followed by one to three strings—and bind the integers as a list called a, but we would not bind the strings.

A pattern may be of infinite length. For example the pattern <a: int # [1 . . . ]> will match one or more integers with no upper limit. This is valid; however, if used to process an endless input stream, an infinite pattern must be paired with some other trigger, such as a time interval, which will indicate when to stop collecting values.

Generally a pattern will consume the data that it matches; however, it is possible to consume only a subset of that data, or none at all. A pattern may contain at mark, called the peek point, beyond which it will match data and bind arguments, but not consume from the input stream. For example, the pattern <a: int; b: int; peek; c: int> will match three integers and bind three local identifiers, but only consume two integers from the input.

It is valid to have a record with no fields or a pattern with no fields. These two cases are meaningfully indistinguishable from each other, as they both denote the product type. Lexically, we designate this concept with the keyword void.

The void is a unique value; it is also its own type. Used in a union, the void gives rise to the notion of an optional type, such as int or void, meaning a value which, if present is an int, but might not be present at all.

For our purposes, type-matching is structural, not nominative. A type does not have a name, only a description. Two types with the same description are the same type. A type whose description is a subset of that of another type is a generalization of that type. For example, consider the types {x: int; y: int} and {x: int; y: int; z: int}. The type with two fields—x and y—is a subset of the type with three fields—x, y and z—and thus the former may be considered a generalization of the latter. This is also true for patterns. A pattern which is a prefix of another is also its generalization.

Our lambda type maps an input pattern to an output type. For example <int # [1 . . . 3]>→int, which is the type of a function which takes one to three integers and returns an integer. Our poly-lambda type is made up of a list of lambda types. The order of the lambdas does matter here. When we are resolving a poly-lambda application, we will dispatch to the first of its constituent lambdas which matches.

Defined in this way, the pattern-matching required to dispatch a poly-lambda may be reduced to a deterministic finite automaton (DFA). To demonstrate how, we will use a method of state machine construction as a basis for comparison and augment it as necessary. A description involves first constructing a nondeterministic finite automaton (NFA) and then reducing it to a DFA; however, in practice, this can generally be done in a single step.

As previously discussed, this application uses the term DFA, but these automatons or units may be referred to stack machines. Strictly speaking, deterministic finite automaton implies finite performance in space. However, an automaton in this patent is not necessarily finite, but can be nonfinite, yet still simple. Therefore, the DFAs as described in this patent may be nonfinite.

Figure 11:
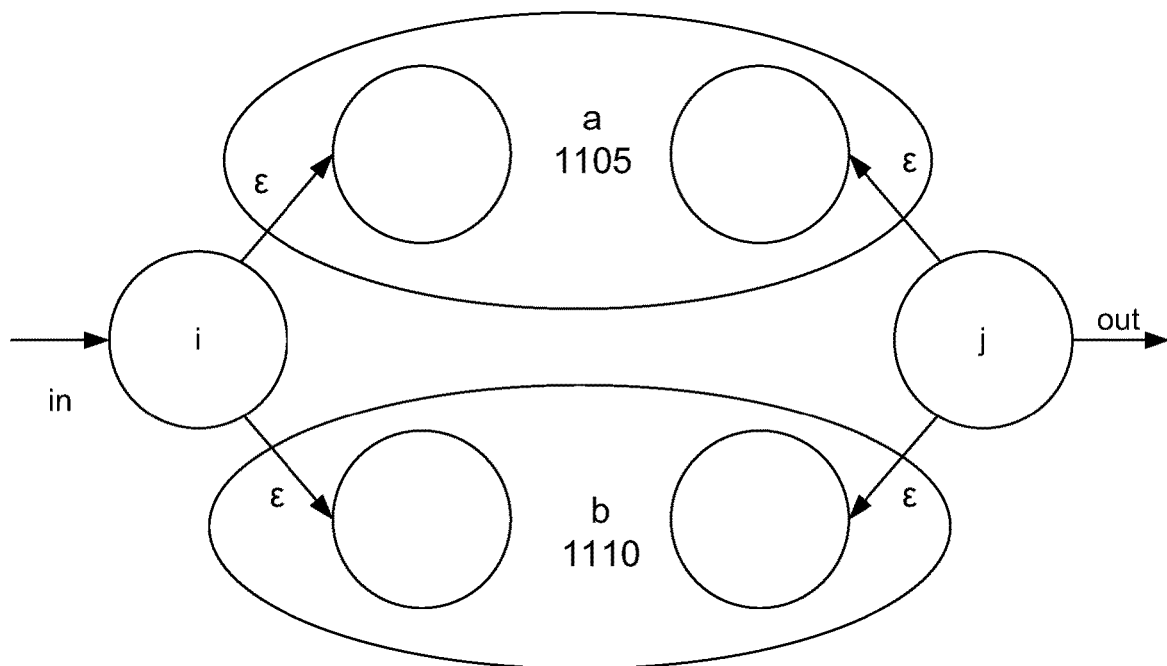
FIG. 11 shows a subgraph for alternation.

First, the constituents of the poly-lambda—the individual lambda patterns—must be thought of as elements of an alternation. In translating a regular expression, the syntax a|b (a OR B) is an alternation: match a 1105 or match b 1110. In our case, a AND b are each lambda patterns. We construct a subgraph for alternation as per FIG. 11.

Figure 12:
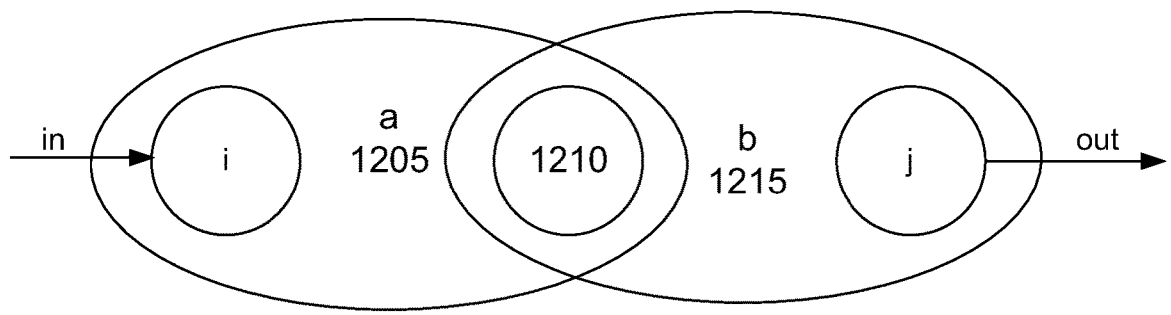
FIG. 12 shows a subgraph for conjunction.

We represent the fields of an individual pattern first by conjunction. In translating a regular expression, the syntax ab 1210 is a conjunction: match a 1205, followed by b 1215. In our case, a AND b are each fields of a pattern. We construct a subgraph for conjunction as per FIG. 12.

Figure 13:
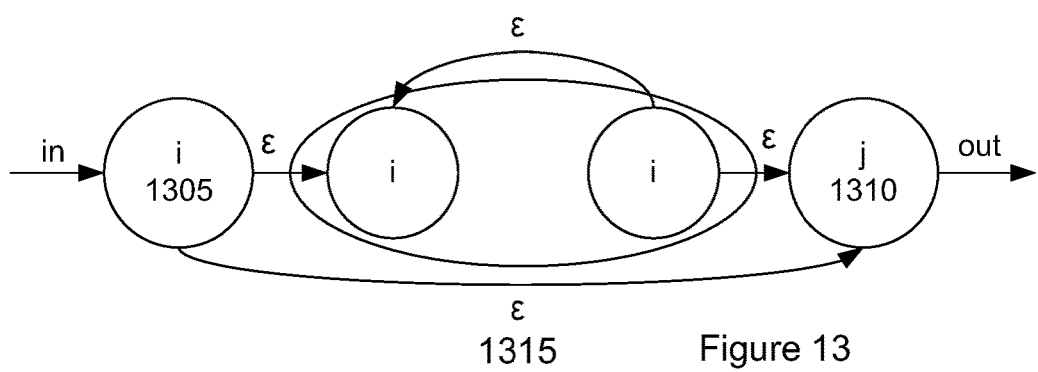
FIG. 13 shows a closure with structures.

The repetition factor of a field is the same as a closure in a regular expression, conventionally written as a+ or a* or a{n:m}. Again, we can represent these closures with structures like those in FIG. 13. In this case, some variation in the subgraph will be necessary based on the value of the repetition set. For example, the forward epsilon 1315 from node i 1305 to node j 1310 is only included if the set includes zero. These variations are largely obvious and continue along with the same basic idea set forth here.

After the intermediate NFA is complete, we reduce it to a DFA, then state-reduce the DFA until a minimal DFA is reached. We then render the DFA as a state-action table, suitable for automation by the usual sort of software or hardware employed in automating state machines. The accepting states of this table mark the entry points to the poly-lambda and the intermediate states provide the collection of data used to bind arguments.

When the DFA is so automated and provided a stream of inputs, it will match a prefix of inputs from the stream and dispatch to the correct overload to handle them, yielding a computed result. If this process is allowed to repeat, the result is a sequence of yielded results, one per match from the input stream. This provides efficient real-time processing of the input data stream by polymorphic functions triggered by corresponding patterns of arguments of various types detected in the data stream.

A method for dispatching execution of polymorphic functions in response to a data stream containing function arguments of multiple kinds, including a mixture of values and type identifiers, includes: (i) Identifying a polymorphic function to be executed, the polymorphic function having a plurality of overloads each associated with a pattern of arguments of different kinds. (ii) Identifying for each overload an output expression to be evaluated over the set of argument values bound from the input stream by matching the argument pattern of the overload. (iii) Translating the argument pattern of each overload into a DFA which will efficiently recognize a match for the pattern in an input stream. (iv) Combining the DFAs of the individual overloads into a single DFA for the polymorphic function as a whole, with the resulting combined DFA capable of matching any pattern that would be matched by the individual DFAs and selecting the overload which should process the matching input. (v) Applying a data stream to the combined DFA, the DFA then examining or consuming data, or both, from the stream as necessary to determine a match or the absence of a match and, in the case of a match, binding the input argument values appropriately and selecting the appropriate output expression to be evaluated. (vi) Dispatching evaluation of the output expression and returning the result.

Given a set of streams of data of distinct types being produced by reactive functions, this invention is a technique to represent those streams such that their outputs may be composed efficiently into a single stream of unified type.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a match can be detected and a handler function applied is of utmost importance, and where there are limited storage and computing resources to devote to the execution.

EXAMPLE

Consider an inflow consisting of a set of n separate input streams, Ai:0<k<n. Each stream consists of a queue of elements of type Ti. Each stream is being consumed and transformed by a reactive function, fi, of the type Ti→Ui, such there is an outflow n streams, Bi, each consisting of a queue of elements of type Ui. We desire to merge the all streams Bi into a single stream, C, using a merging function, m, of the type ΣTk→ΣUk.

Here is an example of such a merge occurring between three streams, written in the Vel language:
B0=f0 from A0
B1=f1 from A1
B2=f2 from A2
C=B0 or B1 or B2

The stream C will consist of values from B0, B1, and B2, interleaved as they are generated. Notice that there is no point to realizing the contents of the B streams, as they are only used to compose the C stream. They could just as easily be represented as anonymous, temporary subexpressions:
C=(f0 from A0) or (f1 from A1) or (f2 from A2)

This invention describes translation of each transformation function fi into a deterministic finite automaton (DFA) and the merge function m as a union of these DFAs into a single, minimal DFA. The result is a maximally efficient means of merging the inflows Ai into the outflow C without having to realize the contents of the intermediate flows Bi.

This technique may be applied repeatedly, conflating subsequent layers of intermediate flows into a single reactive function. This is consistent with the notion of a merge being denoted by an infix or operator in a declarative dataflow language, as is the case in Vel.

This problem is can be solved by brute force; that is, by realizing the intermediate flows and then consuming them, even if the merging function is the only consumer of the intermediate flows.

It is often also the case that the merge function requires its inflows and outflow to all be of the same type, or else of undifferentiated type in the case of typeless systems. This is due to a lack of union types (also called sum types) in their type systems. The presence of a true merge in a dataflow system mandates the use of union types.

Some dataflow systems lack a true merge, instead implementing multi-input-single-output reactive transforms. Although these are useful constructs in their own right, they are not as simple or general as a true merging function and cannot be optimized as completely.

Representing a matching function as a DFA is more efficient than expressing it as an arbitrary expression of Boolean type. The DFAs of multiple matching functions, each with its own driving inflow, are unified to form a single, efficient DFA representing a merge function with a single outflow. The merging of the DFAs may be done such that the result will match as early as possible or as late as possible, resulting in two different, potentially desirable behaviors. Composing multiple reactions into a single DFA results in a minimal machine; that is, an algorithm which performs all the matches using the minimal number of decisions. A minimal machine is most the suitable implementation of multiple reactions for small platforms. A minimal machine has an algorithmic advantage over multiple, separate evaluations of matching expressions and thus, all else being equal, will perform more efficiently.

To merge the set of transformation DFAs into a single DFA, we must consider them as we would alternations in a regular expression. In translating a regular expression, the syntax a|b is an alternation: match a OR match b. In our case, a AND b are each DFAs from transformation functions. We construct a subgraph for their alternation as per FIG. 11.

After the intermediate nondeterministic finite automaton (NFA) is complete, we reduce it to a DFA, then state-reduce the DFA until a minimal DFA is reached. We then render the DFA as a state-action table, suitable for automation by the usual sort of software or hardware employed in automating state machines. The accepting states of this table mark the points at which merged data elements are emitted to the output stream.

When the DFA is so automated and provided a set of input streams, it will transform each input according to the original transformation function associated with that input, and yield all results interleaved together on a single output.

A method for merging multiple, independent streams of input data into a single stream of output data, includes: (i) Identifying a plurality of potential input data streams. (ii) Identifying a plurality of transform functions, one per input stream, which are to be performed on the data in each input stream and the results of which are merged to be together. (iii) Identifying a merging function which receives input data elements from multiple streams simultaneously and interleaves data elements into a single output stream. (iv) Translating each transform function into a DFA which will efficiently perform the transform. (v) Merging the transform DFAs into a single combined DFA which will efficiently perform the transforms and interleave the results into a single stream. (vi) Applying the data streams to the combined DFA, the DFA then performing the work of transformation and merging. (vii) Dispatching the merged output to a destination for use.

This invention is a tool and associated methods for developing software in the Vel programming language. Vel is a programming language useful for expressing dataflow programs. Correct dataflow programming presents many challenges. Some are challenges common to all forms of computer programming while others are specific to the dataflow paradigm. This tool addresses many areas of Vel programming, including: (1) Checking for syntactic and semantic correctness. (2) Checking for logical correctness. (3) Debugging assistance. (4) Translation of source code into a secure and portable form (that is, packaged code). (5) Translation of source code or packaged code into a native and optimal binary form suitable for a variety computing platforms, particularly small platforms. (6) Describing packaged code and confirming its signature. (7) Batch-mode interpretation of packaged code. (8) Interactive interpretation of Vel source. (9) Simulation of a dataflow environment in which to run packaged or native code. (10) Remote execution, monitoring, and control of binary code in a live dataflow environment.

These are the tasks which anyone developing software in the Vel language needs to accomplish. This invention provides sufficient support in all these areas to allow a person proficient in Vel programming to produce correct and useful software.

Checking for syntactic and semantic correctness is a task common to many forms of automatic software translation. Tools for checking for logical correctness are usually not incorporated into the translation tool itself. It is common for these sorts of tools to exist separately, often with imperfect insight into the code they are testing.

Although debugging is a common task in software development, most debugging tools focus on imperative-style programming. Debugging of functional and reactive programming is much less commonly addressed as it presents challenges very different from imperative debugging. In particular, it can be difficult to examine computations "in flight" in these languages, as they values often do not have addresses at which the debugger (and debugging programmer) may peek.

The ability to target multiple native platform architectures is not uncommon for compilers of system languages, such as C, but it is not a power to be commonly found among script-level languages. Scripting languages tend not to be compiled, or to be partially compiled or just-in-time compiled (jitted) for their hosts, but cross-compilation (a compiler running on one architecture but generating code for another) is uncommon. Specifically compiling a script-level language for execution on a small platform is extremely uncommon.

An interactive shell is a common feature of scripting languages. Python, for example, implements a shell. A shell which is connected to a dataflow environment, real or simulated, is far less common.

Remote execution of compiled code is a feature of some operating systems and is also available from several third-party tools, both open source and commercial. These tend not to target small platforms specifically, but some examples of remote execution tools for small platforms do exist. They are not specific to dataflow programming and are not incorporated into the tools used to develop the programs to be remotely executed.

A single, integrated tool for developing Vel code is useful and convenient for software developers working in the Vel language. The tool is principally a compiler, translating the Vel language, but it also offers several other sets of functions related to Vel programming. Having the tool perform logical correctness tests along with syntactic and semantic correctness tests helps the developer be more efficient and promotes greater correctness of code. The logic tests have the benefit of the compiler's insight into the code, so diagnostic messages can be more complete. The interactive shell enables the developer to test code and get an immediate response. This is useful for development as well as debugging. The shell also provides the programmer visibility into the dataflow environment.

Generating stand-alone binary executable code suitable for use on small platforms enables the Internet-of-Things use case, which often relies on performing complex computation on a variety of small devices. Providing a simulated dataflow environment helps developers work out bugs in their code and, in cooperation with tests for logical correctness, demonstrates that a package is working correctly. Remote execution of a compiled package, particularly when the remote platform is small, allows a programmer to iterate quickly on his program, compiling and testing the program on its target hardware in a single command, even if the target platform is not the one on which he is developing.

The process of translating a language from its lexical representation to an intermediate, symbolic representation (phase-1 compilation), and then transforming this intermediate representation into a form which may be executed by computing hardware (phase-2 compilation).

The Vel phase-1 translation tool follows the general strategy common to compilers, specifically: (1) Analyzing the input string to break it into a sequence of tokens. (2) Analyzing the sequence of tokens to form a syntax tree. (3) Identifying symbolic declarations within the tree. (4) Identifying and resolving symbolic references within the tree. (5) Early optimizations, such as common subexpression elimination and constant folding. (6) Type-checking. (7) Additional phases of optimizations and symbol maturation. (8) Finalization of symbols and emission of intermediate representation.

One of the distinguishing features of the Vel phase-1 translator is its use of deterministic finite automata or DFAs to perform the pattern-matching required for function application and to trigger reactions. The phase-1 translation tool includes: (1) A syntax analyzer transforming the input language to a syntax tree. (2) A lexical binding component which permits the program under translation to make self-reference, such that the language under analysis can be modified by the analyzer, in the manner of a DSL or macro-analyzer. (3) A semantic analysis algorithm translating the bound syntax tree into symbols representative of data flows, patterns, reactions, functional expressions, timers, and input/output parameterizations. (4) An expression translator which transforms expression trees into stacks suitable for more or less direct translation into microprocessor ALU instructions. (5) A DFA generator for translating the patterns and expressions of reactions into an intermediate collection of potentially nonminimal DFAs. (6) And a DFA combining and reducing algorithm for producing unified, minimal DFAs from the intermediate collection of DFA.

The output of the phase-1 translation tool includes: (1) The logical identities of each of the streams involved in the translation, such that each may be a unique referent among the plurality of streams. (2) A description of the flow in the data in each stream, each being inward (toward the reactions; that is, a subscription to an external source), outward (away from the reactions; that is, a publication to an external destination), both inward and outward (a publication/subscription pair), or internal (used only as intermediate steps in other reactions and therefore not surfaced as publications or subscriptions). (3) A description of the type of data flowing in each stream, each time being described in finite terms such that data being injected into or extracted from a stream may be statically checked for type correctness. (4) A set of tables describing the states and transitions of the DFAs. (5) A set of expression stacks describing the calculations which are to be performed during reactions. (6) A table mapping stream inputs to DFA inputs. (7) A table mapping timed events to DFA inputs. (8) A table mapping DFA outputs to action pairs, each pair consisting of a reference to an expression stack and a stream output, indicating that the output of the DFA is to be transformed by the given expression then pushed to the given stream.

The Vel interpreter and dataflow simulator use the output of phase-1 translation directly. The interpreter emulates a hardware platform in the execution of the code and the dataflow simulator emulates a streaming data environment, providing inputs to and collecting outputs from Vel streams. Let us call these two tasks instruction interpretation and dataflow emulation.

Instruction interpretation is a category of task well understood by computer programmers who specialize in writing compilers and interpreters. The task includes constructing an execution context in which the states of runtime variables may be stored, and then stepping through the instructions of the program one at a time, accessing data from the execution context and updating it as needed.

In the case of Vel, the execution context must also include a set of queues to hold streams of data in the process of transformation and a table-driven state machine engine to execute the transformations described by the DFAs. The queues arise due to declarations in the Vel source which describe flowing channels of data. Some of these are external inputs or outputs of the Vel program while others are purely internal channels describing intermediate states between input and output.

Dataflow emulation consists of providing access to external sources and sinks for data, such as files or sockets, and the programming necessary to exchange data between these external systems and the Vel program under interpretation. This will include injector functions, which read data from external sources and push them to the queues representing the program's inputs, and extractor functions, which pop data from the queues representing the programs outputs and write them to the external sinks.

Where Vel interpretation according to the invention differs from the norm is in the way the DFAs become involved. The state machine engines read data from the queues and use them to advance the states of their DFAs. The DFA tables include a column of side-effects which are executed when the DFAs move through their states. These side-effects invoke instruction interpretation to perform computation, the results of which are pushed to other queues and this trigger other DFAs.

In this way, a Vel program under interpretation according to the invention is firstly represented by a set of state machines—which are fast and small—and only drop back to general instruction interpretation when necessary. This allows the program to execute with greater efficiency than if it were all to be handled by instruction interpretation alone.

The Vel phase-2 translation tool is, for the most part, not specific to the Vel language but rather to the platform being targeted for execution. The Vel-language-related components of the phase-2 translator are: (1) Initial intake of the intermediate representation produced by phase-1. (2) Overall organization of the phase-2 code generation to produce a reactive system. (3) Provision of a library of runtime support components, such as those that perform external encoding and decoding of data formats or the internal regulation of real-time clocks.

A tool for creating programs for real-time processing of data streams in a multi-source, multi-destination data flow environment, includes: (1) Identifying a plurality of potential data streams. (2) Identifying a set of reactive functions and parameters corresponding to patterns of data in the streams. (3) Identifying a set of handling functions and parameters for transforming data matching declared patterns. (4) Identifying a set of timed events against which patterns of data flow are compared, such as intervals of time in which data are to be collected or discarded or specific points in time before or after which data are to be collected or discarded. (5) Creating a dataflow program describing the identified streams, reactions, functions, and timed events. (6) Providing the program as input to a two-phase translation tool comprising a phase-1 translation tool incorporating a DFA generator for translating Vel program statements to corresponding DFAs and a phase-2 translation tool for generating platform-specific hardware instructions corresponding to the translated Vel statements for execution on the platform. (7) Receiving the output of each phase of the translation tool.

The output of the phase-1 translation tool may be used by the interpreter component, includes: (1) An instruction interpreter which emulates a hardware platform in the execution of the code. (2) A data flow simulator which emulates a streaming data environment, providing inputs to and collecting outputs from Vel streams.

The output of the phase-1 translation tool may be used as the input to the phase-2 translation tool, includes: (1) A hardware instruction generator which translates instructions from the intermediate representation to a form suitable for execution by the target hardware platform. (2) A program organization module, which directs the generation of the output into a form suitable for use in as a reactive program in a dataflow environment. (3) Libraries of runtime support components necessary for execution. The output of the phase-2 translation tool is an executable program suitable for use on the targeted hardware platform.

Given a set of streams of data of varying types and a set of functions meant to react to and handle specific patterns of data in those streams, this invention is a technique to describe and translate those functions such that they can be invoked appropriately and efficiently as data arrives in the streams.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a match can be detected and a handler function applied is of utmost importance, and where there are limited storage and computing resources to devote to the execution.

EXAMPLE

Suppose, for example, that from a given stream of integers we wish to match one or more nonzero values, followed by one or more zeros. When this pattern has been matched, we wish to compute the sum of the nonzero values and write the result to another stream.

We could write the pattern-matching portion of this problem in a regular expression-like notation, and then separately write the computation of the sum as an expression of arithmetic. As it happens, the Vel programming language, designed for use in dataflow applications in edge computing, allows us to write the whole transform in a unified notation, thus:
1. stream foo is int
2. p=pn a:{!=0} . . . , :0 . . . ->sum(a)
3. bar=p(foo)

On line 1, we declare foo to be a stream of integers. On line 2, we define p as a pattern which matches nonzeros values followed by zeros and then computes the sum of the nonzero values. One line 3, we apply p to foo to define a new stream bar, to which the results of the application will be pushed.

The technique would translate the above pattern into a state machine. It would then implement the match as a deterministic pushdown automaton based on that state machine, and feed the resulting matches to the summing expression.

The sort of problem depicted in the above example can be solved by generating two functions: one for matching and one for computing a result after a match is found. The matching function accepts as input a window of data from a stream and returns true for a match and false for a nonmatch. When a match is found, the data window is passed to the result-computing function to produce an output.

As data flows through the window, the matching function must be applied repeatedly until a match is found. Efficiency is thus restricted to the speed with which the matching function can be executed. Any values computed by the matching function in a particular invocation are generally not reused in later invocations, nor are they generally available for use by the result-computing function when a match is found. The lack of retention of the results of possibly useful intermediate computations is potential source of significant inefficiency.

This two-function arrangement arises straightforwardly when stream processing is specified in a language like streaming SQL. The where-clause of a streaming SELECT statement provides a Boolean expression describing the conditions for a match and the matching function is a direct compilation of this expression. The tuple of values named in the product-clause of the SELECT then provide the basis for defining the output-producing function.

Using a state machine to perform the match is more efficient than repeatedly applying multiple, arbitrary Boolean expressions.

The present invention derives a state machine from a pattern description language that declares the parameters of a function. The derived state machine more efficiently detects matches in a data stream than conventional Boolean expression matching functions.

The derived state machine may also implement a set of handler functions to produce outputs based on matches detected in the data stream. Multiple matching and corresponding handler functions may be combined and reduced to a single state machine that efficiently recognizes matches for many patterns simultaneously and produces many kinds of outputs simultaneously.

A script combining aspects of regular expressions and value expressions can be translated automatically into a deterministic state machine which can efficiently match patterns and compute outputs by retaining the results of important intermediate calculations. The resulting combined matching/computing algorithm is more efficient than separate organization of pattern matching and output generation.

The overall approach is thus: (1) Start from a source script which specifies matches using a regular expression-like notation and which specifies output computations based on these matches using a functional expression-like notation. (2) Translate the regular expression-like portions of the script into a set of grammar rules and translate the functional expression-like portions of the script into a set of attributes of those grammar rules. (3) Generate a state machine from the grammar and attributes. (4) Implement the state machine as a pushdown automaton into which flow the inputs to be matched and out of which flow the results.

A technique is called timed forward right-most (1) pattern matching or TFR(1). The following discussion specifies the TFR(1) pattern matching state machine and details how to apply it to accomplish step 4. The section following describes how to translate a grammar into a TFR(1) state machine pursuant to the goals of step 3 (i.e., generate a state machine from the grammar and attributes).

The specific method of translating from a source script into a set of grammar rules and attributes is necessarily dependent on the source script language itself and as such is outside of the scope of this document. The use of grammar rules and attributes is a common technique among computer language implementations, however, so it is reasonable to assume that step 2 will not present too great a hurdle to any implementer.

TFR(1) Pattern Matching

In this section we present TFR(1) pattern matching, a technique that can be used to efficiently recognize patterns of streaming input based on a large class of context-free grammars. The abbreviation stands for "Timed Forward Right-most (1)", referring to the time-aware nature of the technique, the fact that it scans inputs in forward order (with respect to time), and produces a rightmost syntactic derivation, while only looking at a single input token at a time.

Overview. The objective of a TFR(1) pattern-matcher (hereinafter simply a "matcher") is to react to a stream of inputs by producing a stream of outputs. A pattern of expected inputs is described ahead of time and a matcher pre-built to match that pattern. After it matches an input pattern, a matcher produces one or more outputs based on the matched inputs.

A TFR(1) matcher has several notable features: (1) A matcher can be constructed algorithmically from a set of grammar-like rules describing a pattern to be matched and transductions to be applied. (2) A matcher can incorporate the notion of time outs during matching, causing matches to advance due to the passage of time. (3) A matcher can be constructed algorithmically from any unambiguous context-free grammar. (4) A matcher is compact and efficient, suitable for implementation on computers with limited storage or low-end processors, or both. It takes the minimum number of steps to match an input. (5) A matcher operates without backtracking, moving strictly forward in the input, making it suitable for processing flowing streams. (6) A matcher detects nonmatching (erroneous) inputs as soon as it is possible to do so and can fast-forward past them, resynchronize with the input stream, and resume matching. (7) After matching an input sequence, a matcher can use the matching data as an argument to an arbitrary function, the results of which are produced as output.

Syntax with Time and Endlessness. Data flowing in a stream can be analyzed syntactically. The approach is similar to the kind of syntactic analysis used in parsing computer source code. TFR(1) is, in fact, similar to the canonical LR(1) parsing algorithm, and familiarity with canonical LR(1) and with syntactic analysis in general will be helpful to any reader interested in TFR(1).

A stream differs from a file in two ways: (1) Each data element in a stream has associated with it (implicitly or explicit) a specific time at which it entered the stream, whereas a data element in a file has no specific time associated with it. (2) A stream need not have an explicit end but can go on flowing indefinitely, whereas a file has a fixed size so its end can always be expected.

LR(1), in common with most other parsing algorithms, is meant to operate on files. It takes no account of time and depends upon the end-of-file marker for correct operation. However, TFR(1) is intended for use with streaming inputs. It is aware of time and does not require and end-of-file marker.

Inputs

An input queue is a first-in, first-out, nonterminating sequence of discrete, incoming events to be processed one at a time. This might be a network socket, a serial port, an in-memory structure, or any other material or abstract implementation of the notion of an endless queue or stream. The purpose of the matcher is to recognize patterns in this stream.

Each carries a stamp, which marks the time at which the token entered the queue, and possibly some other information. There are three kinds of events: tokens, lapses, and breaks.

A token is an event which carries data to be analyzed. It is by far the most common kind of event, so much so that the terms "event" and "token" are sometimes used interchangeably. The data element carried by the token can be an instance of any strong data type, and all the tokens in a particular input queue carry the same type of data. A token typically carries a single byte or character (when the matcher is decoding a wire format or recognizing words) or a multi-valued data record (when the matcher is analyzing multidimensional data from a sensor).

In some cases, the number of possible states of the token type is very large. This is not the case for 8-bit bytes, which have only 256 possible states, but is the case for larger types, such as 32-bit integers or records made up of many fields. In these cases, it is often necessary to provide a token classifier function. Given a token, a classifier function returns a class to which the token belongs. For example, a pattern might involve two classes of 32-bit integers: zero and nonzero. The driver then uses class of the token in lieu of the token itself when deciding what action to perform.

A lapse is an event which carries no data besides its stamp. It is, in essence, a "nonevent," indicating nothing but the passage of time. Inclusion of this sort of event in the input queue is useful because it distinguishes between an input queue which is actively receiving events, even if there is no data to report, and one which is receiving nothing.

A break is an event which indicates an instantaneous disruption in the input queue. The matcher responds to a break by finishing up whatever partial matches it was working on and reporting its outputs immediately. A break is not an end-of-input marker; additional events can (and generally do) follow a break. It is merely an event that can be injected into an input stream at will to accelerate the action of the matcher.

Rules. We write a grammar as a series of rules. In each rule, a reduction appears on the left and a sequence of symbols appears on the right. Each symbol is either tokens or reduction. For example:
(r1) E→E '+' E
(r2) E→num These two rules describe a language made up of tokens num and "+" and the reduction E. By r1, each time a num appears in the input, it may be considered an E. By r2, each time we see a sequence of E+E in the input, we may the three symbols collectively to make up a new E. Therefore the sequences num, num+num, and num+num+num are all valid sentences of the language.

It is also possible for a rule to be empty, meaning it has no symbols on its right hand side. This is useful for situations in which a particular piece of syntax is to be considered optional. For example:
(r3) L→L 'x'
(r4) L→λ

We write lower-case lambda on the right-hand side to denote emptiness. In this case, the reduction L consists of itself followed by an "x" (by r3), or else is nothing (by r4). Therefore, the sequences x, x x, and x x x are all valid sentences of the language. An empty sequence is also a valid sentence of the language, as L would match it. It is also possible an empty rule to specify a time out. For example:
(r5) C→C 'x'
(r6) C→τ5

The C reduction of this language is very similar to the L reduction of the language above; however, while L will collect x's indefinitely, C will only collect x's for a finite amount of time. The amount of time is here given as 5 units. The unit can be any convenient measure of time. In practice, time outs are likely to be given in milliseconds. To understand the difference here, consider a sequence of inputs with time stamps:

| 1000 | 'x' |
| 1001 | 'x' |
| 1002 | 'x' |
| 1003-1009 | no input |
| 1010 | 'y' |

Here we have three x's arriving in rapid succession, then a lull, then a "y." Using r3 and r4 to match against this input, the matcher would report an L at time 1010, because the appearance of the "y" would indicate the end of the string of x's. However, using r5 and r6, the matcher would report a C at time 1005, because the passage of time alone would be sufficient to invoke the reduction.

Intuitively, a lambda-rule (an empty rule with no time out) will wait until it can see the next token before deciding what to do, which means it will wait indefinitely. A tau-rule (an empty rule with a time out) will also wait for the next token, but if that token does not come soon enough, the rule will decide to act in its absence.

Attributes. An attribute is a function defined over a set of grammar rules. As the matcher applies a rule to perform a reduction, it also applies the attribute functions for that rule. The result is a value which can be used to compute further attributes or become the output of the matcher, or both. This process is called attribute synthesis. Let us look again at one of the sample languages above:
(r1) E→a:E '+' b:E
(r2) E→a:num The language being recognized here is unchanged from the previous example; however, we have added explicit names to the symbols. We can use these names in our definition of an attribute:

```
int val {
    r1: a,
    r2: val(a) + val(b)
}
```

Here we are defining val, an attribute which produces values of type int. When r1 is applied, the value of val is defined to be simply the number a, which is the literal number taken from the input stream. When r2 is applied, the value of val is defined recursively, evaluating val of a and b and summing the result. Symbols a are b are instances of E.

Intuitively, attribute synthesis begins with values which can be derived from individual tokens (or even just the token itself). Synthesis proceeds toward operations of greater scope as the matcher applies rules and generates reductions. An attribute of a high-level reduction depends, directly or indirectly, on any or all of the tokens that it spans.

Augmented Grammar and Restarting. An augmented grammar is one which contains exactly one omega-rule. An omega rule is similar to a normal grammar rule, except it has exactly one symbol on its right and the special omega symbol on its left. For example:

Here we have augmented the grammar from the previous example by adding r0, an omega rule.
(r0) Ω→E
(r1) E→E '+' E
(r2) E→num The omega rule of a grammar tells the matcher where to begin and end. When first started, the matcher tries to match the symbol on the right of the omega rule. In this case, r0 says the matcher will initially try to match the reduction E.

After matching the symbol on the right side of the omega rule (or after recovering from failing to match it), the matcher automatically restarts and attempts to match that symbol again. The matcher thus goes on matching the omega rule indefinitely.

A break event in the input queue causes the matcher to accept any lambda- or tau-rules that might currently be pending and proceed to reduce to the omega rule immediately. The matcher then restarts to accept the events after the break.

The omega rule must appear in the definition of exactly one attribute. This attribute is used to compute the output of the matcher, as described in the next section.

Outputs. An output queue is a first-in, first-out, nonterminating sequence of discrete, outgoing events. An output queue is similar in concept to an input queue, but flowing away from the matcher instead of toward it. Like the input queue, the output queue might be a network socket, a serial port, an in-memory structure, or any other material or abstract implementation of the notion of an endless queue or stream. The purpose of the matcher is to send events to this queue. The matcher never attempts to read from the output queue.

Each event in the output queue contains a stamp, marking the moment in time when the matcher generated the event. Each event also carries a data element, which can be an instance of any strong data type, and all the events in a particular output queue carry the same type of data. This may be the same type as the events in the input queue or it may be a different type.

When the matcher reduces by the omega rule, the matcher evaluates the (only) attribute of the omega rule and pushes the result to the output queue as an event. The output event so generated will have a stamp equal to that of the most recent input event.

Figure 14:
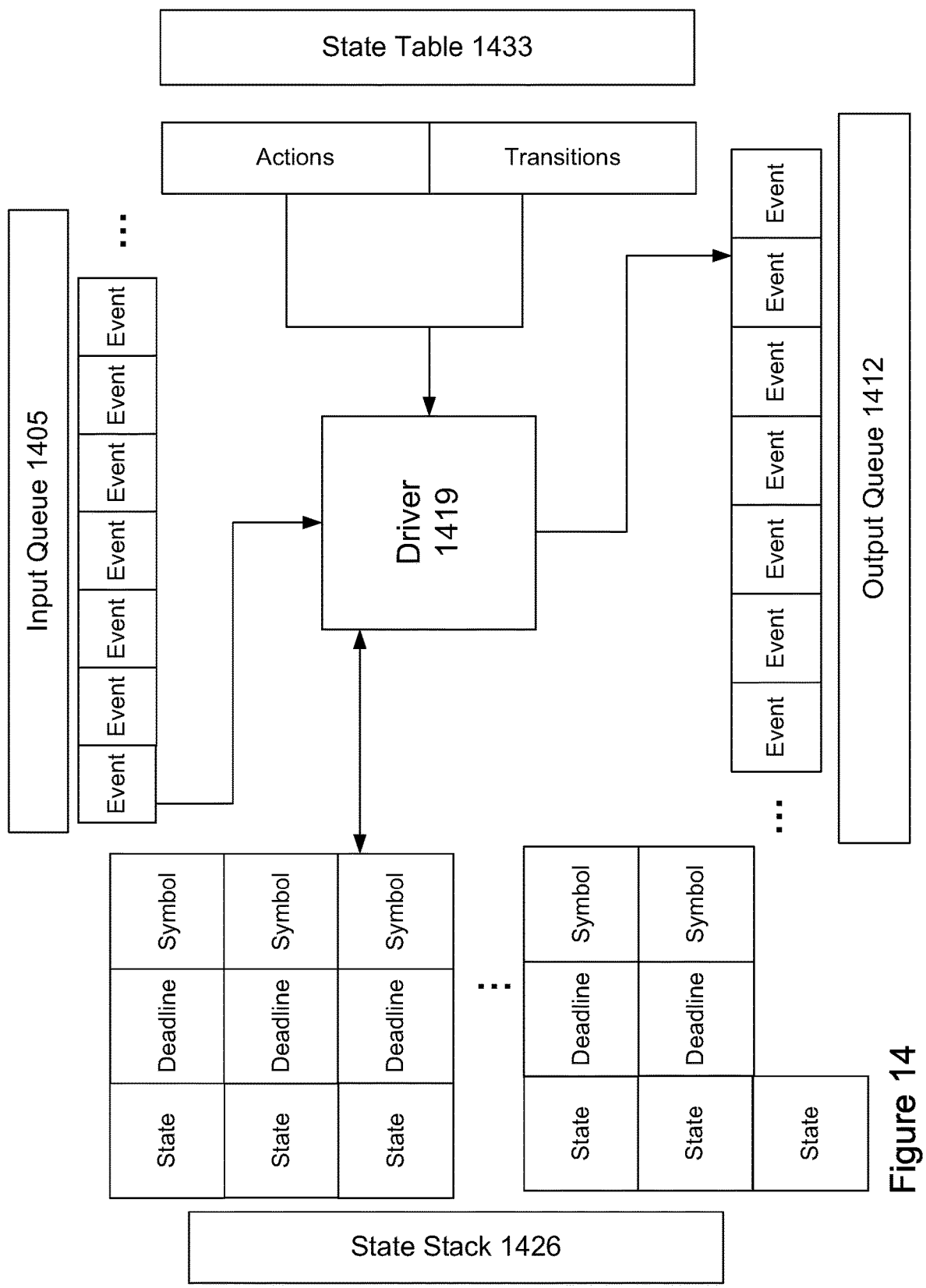
FIG. 14 shows components of a pattern matcher using a technique referred to as timed forward right-most (1) or TFR(1) pattern matching.

Architecture. FIG. 14 shows components of TFR(1) pattern matcher. Each TFR(1) matcher consists of an input queue 1405, an output queue 1412, a driver program 1419, a state stack 1426, and a state table 1433.

The matcher maintains a read position at the head of the input queue. It pops events from the front of the queue one at a time. The matcher never looks ahead in the input queue, nor does it attempt to rewind its read position to an earlier point in the queue, nor does it attempt to push events to the input queue. This one-at-a time, forward-only, read-only treatment of inputs is part of what makes TFR(1) well suited to efficient processing real-time streams.

The driver program is the same for all matchers. It is a pushdown automaton driven by the states defined in a separate table. An algorithm for the driver program is presented in below. Each implementation of the driver program is specific to its host hardware, operating system platform, and other specifics of its environment; however, the driver is not specific to the pattern to be matched. The driver program is always the same; it is the state table which is specific to the pattern to be matched The driver uses a state stack to keep track of its progress through the states defined by the state table. The first entry on the stack always consists of a reference to the first state in the table. Each subsequent entry on the stack consists of a reference to some state in the table, a deadline by which the state must be resolved, and either a token taken from the input queue or a reduction taken from the left-hand side of a grammar rule.

The reductions on the state stack have associated with them the attributes which could be computed from their rules. When a new reduction is ready to be applied, the states on top of the stack provide the calling frame used to apply the attribute definition functions associated with the new reduction. In this way, the state stack is also the function call stack. This also means the results of intermediate computations are automatically retained for later use but are also discarded (when the stack is popped) when they are no longer of potential interest.

The state table is generated algorithmically from a set of grammar rules and attributes describing the pattern to be matched and the outputs to be produced. A method of generating the table is described below. Once generated, a state table does not change. The driver program is guided by a table but it does not alter the table. In fact, it is possible for several instances of the driver program to share the same state table. This would be a useful configuration if one desired to match the same pattern in multiple input streams and produce multiple output streams.

The state table is made up of a finite number of rows, each of which defines a parsing state. A parsing state is an abstract concept which defines a distinct point in the decision-making process of grammar-driven pattern-matching. Each parsing state is made of three parts: actions, transitions, and a time out value.

The actions of a parsing state map each token value to an action to be taken by the driver. The driver uses this portion of the table in its main loop. This section of the table is keyed by the tokens of the grammar or by the classes into which tokens are grouped. The break event is also a key in this section of the table.

The transitions of a parsing state map each kind of symbol to a parsing state. The driver uses portion of the table when performing a reduce action. This section of the table is keyed by the reductions of the grammar.

The time out of a parsing state indicates the maximum amount of time the driver is allowed to remain in the state. This can be (and commonly is) explicitly infinite, meaning the driver may spend any amount of time in the state.

Driver Algorithm. The driver begins with a stack containing a single entry. The entry refers to the starting state (always denoted s0) and has a deadline equal to the starting time plus the time out of s0. This first stack entry has no associated symbol, but later entries will each carry either a token or a reduction.

The driver then enters its main loop, which iterates indefinitely. At the start of each iteration, the driver looks at the entry on top of the stack and the event at the front of the input queue.

The driver compares the stamp of the current event to the deadline of the current stack entry. If the stamp is equal to or greater than the deadline, then the state has expired and the driver must immediately attempt to leave the state. While in an expired condition, the driver will treat the current input as a break, regardless of what kind of event it really is.

If the current event is a lapse (and the current state has not expired), the driver simply discards it (see below) and returns to the top of the main loop. A lapse serves no purpose other than to allow states to expire.

If the current event is a token or a break (or if the current state has expired and we are treating the current event as a break), the driver looks up the action to take in the action portion of the current state. The action will advance the input queue to the next token, push or pop the stack, push to the output queue, or any combination of these. After performing the action, the driver returns to the top of the main loop.

There are five kinds of actions for the driver can perform: shift, discard, reduce, restart, or panic. In each iteration, the driver will perform exactly one of these.

A shift action consists of a reference to a state. The action causes the driver to pop the current event from the input queue, advancing the queue to the next event. The event must be a token; the driver does not shifts lapses or breaks. The driver then pushes to the stack a new entry consisting of the state indicated by the action, a new deadline, and the popped token. The new deadline is equal to the lesser of: the current deadline, or the stamp of the event plus the time out of the state.

A discard action causes the driver to pop the current event from the input queue, advancing the queue to the next event. The driver remains in the same state. This is what happens to lapses and real breaks.

A reduce action consists of a reference to a grammar rule. A reduce action takes place in three phases: synthesize, pop from the stack, and push to the stack.

Synthesize. The driver evaluates the attributes of the rule being applied.

Pop from the stack. The driver pops one or more entries from the stack. The number of entries to pop is given by the length of the right-hand side of the rule being applied. Let the state on top of the stack after the pop be called P and the symbol on the left-hand side of the applied rule be called L.

Push to the stack. The driver looks up symbol L in the transitions of state P, giving a new state N. The driver then pushes to the stack a new entry consisting of the state N, a new deadline, and the symbol L.

A restart action takes place in three phases: synthesize, reset stack, and discard break.

Synthesize. The driver evaluates the attribute of the omega rule and pushes the result to the output queue.

Reset stack. The driver clears all entries from the stack, then pushes a new starting entry. The new entry consists of a reference to s0 and a deadline equal to the stamp of the input event plus the time out of s0. The entry contains no symbol.

Discard break. If the current input is a real break (and is not just being treated as one due to the current state having expired), the driver discards it now.

A panic action causes the driver to discard inputs until it can resynchronize, then restart the stack.

Parsing

Intuitively, a matcher breaks the task of pattern matching into a series subtasks, each one matching a piece of the pattern. Each of these tasks is in turn broken down, and this process recurses until the pieces to be matched are simply the input tokens themselves, which can be trivially matched.

The task of decomposing the pattern into matchable pieces is done by the matcher generator and the result is encoded in the states of the state table. The driver follows the these states, executing the matching subtasks.

When the driver takes a shift action, it is because the input token is part of the driver's current matching subtask. The driver is extending the current piece of the match to include the token.

When the driver takes a reduce action, it is because the input token is not part of the driver's current matching subtask. The driver is marking the end of the current piece of the match and moving on to the next piece, of which the input token will be the first part.

When the driver takes a panic action, it is because the input token is not part of any matching subtask and that the whole matching state up to that point is erroneous. The driver discards its accumulated state as well as the offending token and starts afresh.

The behavior of the driver is completely deterministic and as such it can modeled easily in a diagram. There are several such diagrams in this document, and they employ a consistent notation.

Circle. A state in the table. This also shows the state's time out, which can be infinite.

Solid arrow. Shift action. The label on the edge indicates the token being matched. The arrow leads to the next state.

Backward-headed arrow. Reduce action, pop phase. The label on the edge indicates the token being matched. The arrow leads from the grammar rule being applied.

Diamond. Grammar rule. The text in parentheses indicates the number of entries to pop from the stack and the symbol to be matched.

Dashed arrow. Reduce action, push phase. The label on the edge indicates the symbol being matched.

You can use the diagram to perform the algorithm of the driver.

1. Use a separate piece of paper to track your stack. Start by pushing state s0 onto the stack along with the first deadline.

2. Look at the state on top of the stack and the current input token. Follow the edge which leads out of the state and which is labeled with the current token.

3. If the edge is a solid arrow leading to another state, push the state it points to onto the stack along with the new deadline and the current token, advance the input to the next token, and go back to step 2.

4. If the edge is a backward-headed arrow connecting to a rule, look at the rule it connects to. The rule will list a number of entries to pop and a reduction. Pop the indicated number of entries from the stack, then look at the new top state. Find the dashed edge which leads from that state and which is labeled with the reduction. Push the state the dashed edge points to onto the stack, along with the new deadline and the reduction. If the reduction was not omega, and go back to step 2; otherwise, go back to step 1.

EXAMPLES

In this section we provide several examples of TFR(1) in action. We compare it, where feasible, to the behavior of other common forms of stream-based pattern-matching which, like streaming SQL, are based on expression evaluation.

Example 1: Pets

In this example, we consider a matcher which looks for lists of pets. Each list may contain any number of pets (or no pets), and each pet is either a cat, a dog, or a canary. The lists are collected from an input stream at intervals of 50 time units.

Table B shows the grammar. The omega rule (r0) matches lists of pets. Each list consists of a list of pets followed by a pet (r5) or of nothing (r4). This grammatical structure for collecting lists is a common feature of parsers which seek the rightmost derivation of an input. Rules r1, r2, and r3 define what a pet can be.

Table C shows the states which have been derived from this grammar. An action such as "s4" means "shift and go to state 4," while an action such as "r2" means "reduce by rule 2 and follow the transition." The curling arrow (↺) means to restart. A blank action means panic.

Figure 15A:
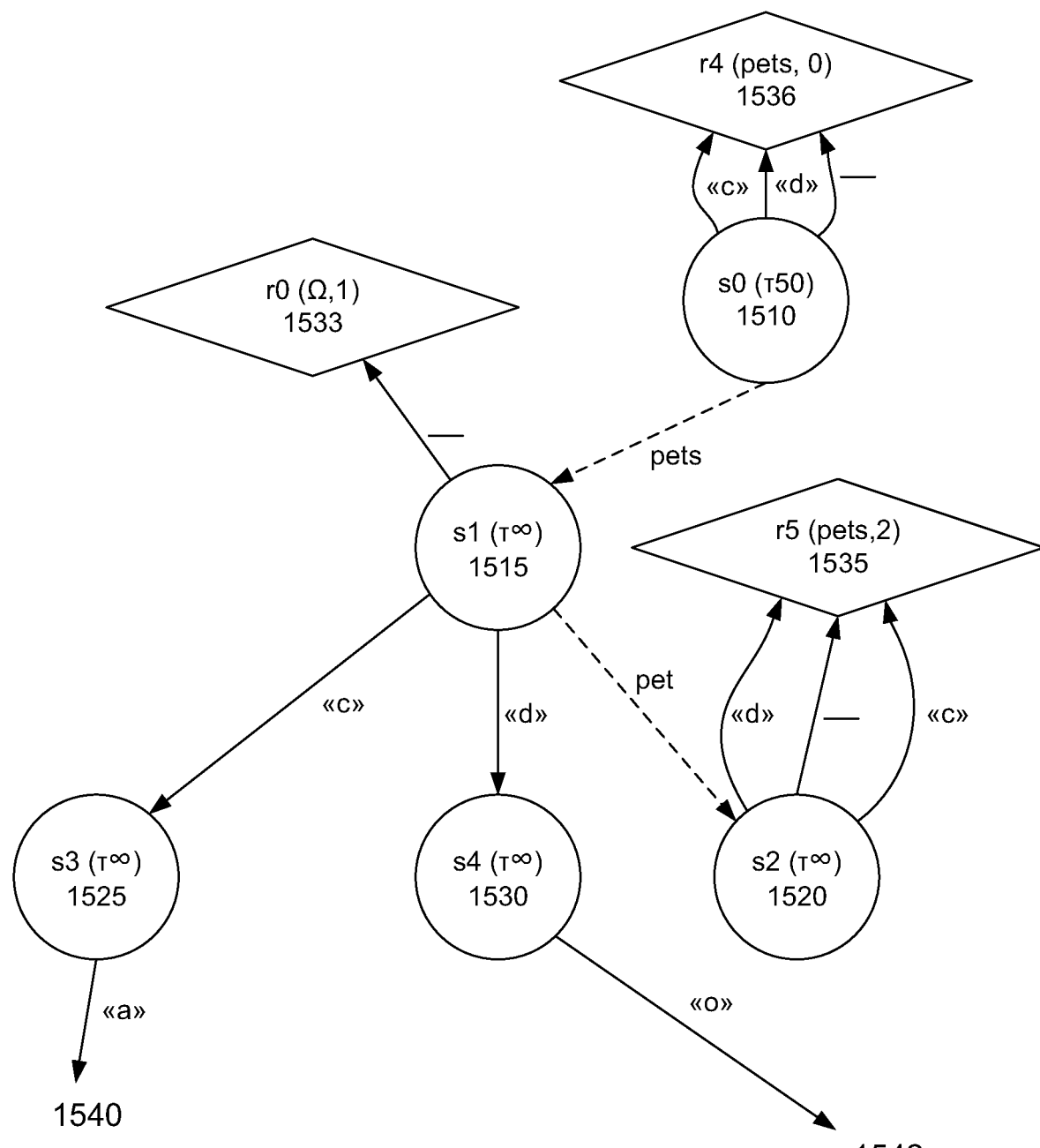
FIGS. 15A-15B show state machine diagram of a "pets" example.
Figure 15B:
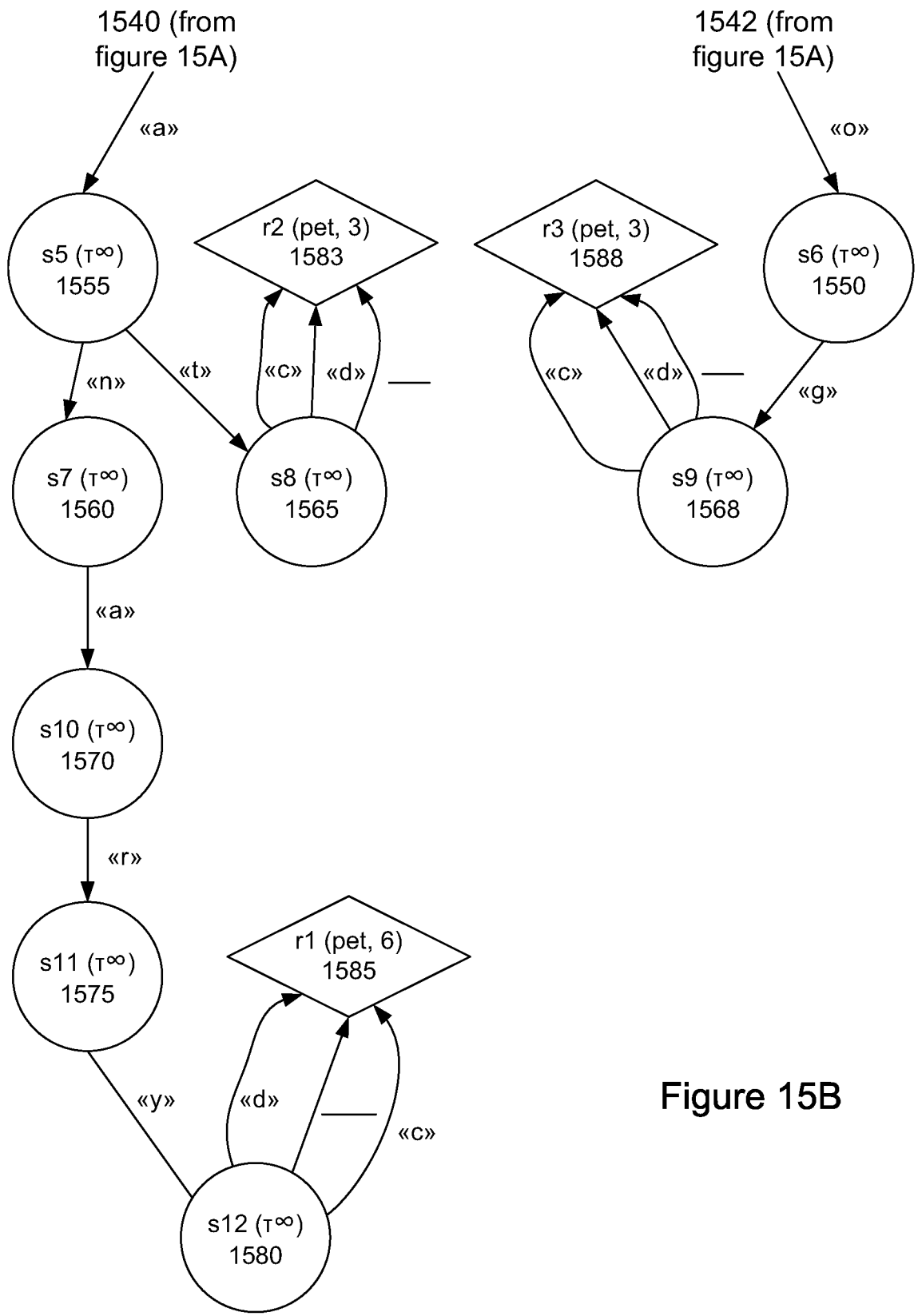

FIGS. 15A-15B show the same information as table C, but in a more visually comprehensible way. In this diagram, one can readily see, for example, that the distinction between "dog" and the other two kinds of pets happens very early in the match, while the distinction between "cat" and "canary" takes two more steps.

TABLE B

| Grammar of "pets" | |
|---|---|
| Rule | Syntax |
| r0 | Ω → pets |
| r1 | pet →《c》《a》《n》《a》《r》《y》 |
| r2 | pet →《c》《a》《t》 |
| r3 | pet →《d》《o》《g》 |
| r4 | pets → τ50 |
| r5 | pets → pets pet |

TABLE C

Parser Table of "pets"

| State | Action a | c | d | g | n | o | r | t | y | — | Transition pet | pets | Time Out |
|---|---|---|---|---|---|---|---|---|---|---|---|---|---|
| s0 | | r4 | r4 | | | | | | | r4 | | s1 | τ50 |
| s1 | | s3 | s4 | | | | | | | ↻ | s2 | | τ∞ |
| s2 | | r5 | r5 | | | | | | | r5 | | | τ∞ |
| s3 | s5 | | | | | | | | | | | | τ∞ |
| s4 | | | | | | | | s6 | | | | | τ∞ |
| s5 | | | | | | | s7 | | s8 | | | | τ∞ |
| s6 | | | | s9 | | | | | | | | | τ∞ |
| s7 | s10 | | | | | | | | | | | | τ∞ |
| s8 | | r2 | r2 | | | | | r2 | | | | | τ∞ |
| s9 | | r3 | r3 | | | | | r3 | | | | | τ∞ |
| s10 | | | | | | | | | | s11 | | | τ∞ |
| s11 | | | | | | | | | | | s12 | | τ∞ |
| s12 | | r1 | r1 | | | | | r1 | | | | | τ∞ |

FIGS. 15A-15B show state machine diagram of "pets." The diagram shows rules and states. In FIG. 15A, there are states s0 1510, s1 1515, s2 1520, s3 1525, and s4 1530. There are rules r0 1533, r0 1535, and r4 1536. Arrows 1540 and 1542 connect to corresponding arrows in FIG. 15B. In FIG. 15B, there are states s2 1550, s3 1555, s7 1560, s8 1565, s8 1568, s10 1570, s11 1575, and s12 1580. There are rules r2 1583, r2 1585, and r3 1588.

Table D shows a trace of the driver matching the input "catcanarydog" with each event separated in time by one unit. The input then ends with a lapse until time unit 50.

There are several things to note: (1) The driver buffers the input tokens (on the stack) only long enough to recognize the part of the pattern they match. Once they are matched, the inputs are reduced. (2) Each input is examined by the driver only once. (3) The driver reacts to the absence of input as well as its presence. The final reduction is triggered merely the lapse. (3) The driver ends up in the state in which it started, ready to continue matching.

TABLE D

Sample Trace of "pets"

| Step | Stack | Input | Action |
|---|---|---|---|
| 1 | [s0-1050] | 1000:«c»1001:«a»1002:«t»1003:«c»1004:«a»1005:«n»1006:«a»1007:«r»1008:«y»1009:«d»1010:«o»1011:«g»1050: τ | reduce by r4, go to s1 |
| 2 | [s0-1050] [s1-1050 pets] | 1000:«c»1001:«a»1002:«t»1003:«c»1004:«a»1005:«n»1006:«a»1007:«r»1008:«y»1009:«d»1010:«o»1011:«g»1050: τ | shift, go to s3 |
| 3 | [s0-1050] [s1-1050 pets] [s3-1050 «c»] | 1001:«a»1002:«t»1003: «c»1004:«a»1005:«n»1006:«a»1007:«r»1008:«y»1009:«d»1010:«o»1011:«g»1050: τ | shift, go to s5 |
| 4 | [s0-1050] [s1-1050 pets] [s3-1050 «c»] [s5-1050«a»] | 1002:«t»1003:«c»1004:«a»1005:«n»1006:«a»1007:«r»1008:«y»1009:«d»1010:«o»1011:«g»1050: τ | shift, go to s8 |
| 5 | [s0-1050] [s1-1050 pets] [s3-1050 «c»] [s5-1050«a»] [s8-1050«t»] | 1003:«c»1004:«a»1005:«n»1006:«a»1007:«r»1008:«y»1009:«d»1010:«o»1011:«g»1050: τ | reduce by r2, go to s2 |
| 6 | [s0-1050] [s1-1050 pets] [s2-1050 pet] | 1003:«c»1004:«a»1005:«n»1006:«a»1007:«r»1008:«y»1009:«d»1010:«o»1011:«g»1050: τ | reduce by r5, go to s1 |
| 7 | [s0-1050] [s1-1050 pets] | 1003:«c»1004:«a»1005:«n»1006:«a»1007:«r»1008:«y»1009:«d»1010:«o»1011:«g»1050: τ | shift, go to s3 |
| 8 | [s0-1050] [s1-1050 pets] [s3-1050 «c»] | 1004:«a»1005:«n»1006:«a»1007:«r»1008:«y»1009:«d»1010:«o»1011:«g»1050: τ | shift, go to s5 |
| 9 | [s0-1050] [s1-1050 pets] [s3-1050 «c»] [s5-1050«a»] | 1005:«n»1006:«a»1007:«r»1008:«y»1009:«d»1010:«o»1011:«g»1050: τ | shift, go to s7 |
| 10 | [s0-1050] [s1-1050 pets] [s3-1050 «c»] [s5-1050«a»] [s7-1050«n»] | 1006:«a»1007:«r»1008:«y»1009:«d»1010:«o»1011:«g»1050: τ | shift, go to s10 |
| 11 | [s0-1050] [s1-1050 pets] [s3-1050 «c»] [s5-1050«a»] [s7-1050«n»] [s10-1050«a»] | 1007:«r»1008:«y»1009:«d»1010:«o»1011:«g»1050: τ | shift, go to s11 |
| 12 | [s0-1050] [s1-1050 pets] [s3-1050 «c»] [s5-1050«a»] [s7-1050«n»] [s10-1050«a»] [s11-1050«r»] | 1008:«y»1009:«d»1010:«o»1011:«g»1050: τ | shift, go to s12 |
| 13 | [s0-1050] [s1-1050 pets] [s3-1050 «c»] [s5-1050«a»] [s7-1050«n»] [s10-1050«a»] [s11-1050«r»] [s12-1050«y»] | 1009:«d»1010:«o»1011:«g»1050: τ | reduce by r1, go to s2 |
| 14 | [s0-1050] [s1-1050 pets] [s2-1050 pet] | 1009:«d»1010:«o»1011:«g»1050: τ | reduce by r5, go to s1 |

TABLE D-continued

Sample Trace of "pets"

| Step | Stack | Input | Action |
|---|---|---|---|
| 15 | [s0-1050] [s1-1050 pets] | 1009:«d»1010:«o»1011:«g»1050: τ | shift, go to s4 |
| 16 | [s0-1050] [s1-1050 pets] [s4-1050 «d»] | 1010:«o»1011:«g»1050: τ | shift, go to s6 |
| 17 | [s0-1050] [s1-1050 pets] [s4-1050 «d»] [s6-1050«o»] | 1011:«g»1050: τ | shift, go to s9 |
| 18 | [s0-1050] [s1-1050 pets] [s4-1050 «d»] [s6-1050«o»] [s9-1050«g»] | 1050: τ | reduce by r3, go to s2 |
| 19 | [s0-1050] [s1-1050 pets] [s2-1050 pet] | 1050: τ | reduce by r5, go to s1 |
| 20 | [s0-1050] [s1-1050 pets] | 1050: τ | report and restart |
| 21 | [s0-1100] | 1050: τ | discard |

Stream processors can use expression evaluation to look for matches. In the SELECT statement of streaming SQL, for example, one will find a where-clause. This clause specifies an expression to evaluate and, when the result is true, the selection matches. For example, if the current input were represented by the identifier word, then a where-clause to look for pets might be word="cat" or word="dog" or word="canary."

The contents of word must be buffered until the selection achieves a match. Each time a new input arrives, word must be extended by a single character and then the whole expression must be reevaluated.

Nothing learned from prior iterations is carried into the next. For example, if word currently contained "do," the expression would still need to compare it against "cat" and "canary," which could not possibly match. Each character of word might be examined any number of times before a decision was reached.

This is far less efficient than TFR(1), which never examines an input more than once. Each parsing state implicitly carries with it information about the states which precede it. For example, the decision of dog versus not-dog is made at s1. Subsequent states like s3 and s4 already know whether or not "dog" is still a possible match.

Constructing TFR(1) State Tables. This section describes the algorithm used to construct a state table from a set of grammar rules. There are three overall steps:

1. Compute the first and follow sets of the all symbols.
2. Generate the starting state from the starting items and then generate all states reachable directly or indirectly from the starting state.
3. Generate the table entries for each generated state.

Before we can explain these steps, however, we will first need to define some of the concepts involved.

Concepts. First and Follow. The first set of a symbol is the set of tokens that can begin sequences of events derived from that symbol. If the symbol is a reduction with an empty rule, then the first set of the symbol also contains the special marker ε.

To compute First(X):
1. If X is a token, then First(X) is just {X}.
2. If X is a reduction with an empty rule, add ε to First(X).
3. For each nonempty rule having X as its left-hand side, add to First(X) the first set of each of the first symbol on the right-hand. If this right-hand symbol is itself a reduction with an empty rule, then add to First(X) the first set of the next symbol on the right hand side. Continue in this fashion until you encounter a right-hand symbol without an empty rule, or until there are no more right-hand symbols.

A first set is also defined for a sequence α consisting of two or more symbols. To compute First(α):
1. Start with the first set of the first symbol in a. If this does not contain £, return this set as First(α).
2. If it does contain ε, remove ε from the set and add the first set of the next symbol in α. Continue in this way until you encounter a symbol with a first set that does not contain ε or until you reach the end of α.

The follow set of a symbol is the set of events which can follow the symbol in a recognizable sequence. To compute Follow(X):
1. If X is Ω, its Follow(X) contains the break event as well as all the events in First(Ω).
2. Examine each rule in which X appears on the right-hand side. Let A be the left-hand side of this rule and let β be the sequence of symbols which appear to the right of X in this rule. If β is nonempty, then Follow(X) includes First(β); otherwise, Follow(X) includes Follow(A).

Items and States. An item of a grammar represents a particular point reached during a match. An item consists of a reference to one of the rules of the grammar, a dot position within the rule, and a lookahead event. For example, [pet→<<c>>•<<a>><<t>>, <<c>>] is an item of the pets grammar.

The dot position in an item indicates the exact position at which the match will next take place. The dot may come before any symbol on the right-hand side of the rule, or it may come after the last symbol. In the latter case, the item is said to be complete. If an item is not complete, then the symbol immediate after the dot is called the corner of the item. A complete item has no corner symbol. The sequence of symbols before the dot is called the alpha sequence and the sequence of symbols after the corner is called the beta sequence. Either or both of the alpha and beta sequences can be empty.

An item which refers to an empty rule has only a single possible dot position. Such an item is considered complete. It has no corner symbol and its alpha and beta sequences are empty.

The lookahead event of an item is either a token or break. In a complete item, the lookahead helps the parser generator to decide whether it should reduce the item as-is or shift another event.

The starting items of a grammar are one of the items from which matching can begin. Each starting item refers to the omega rule and has its dot on the far left. To generate the set of starting items of a grammar, compute Follow(Ω). For each symbol F in Follow(Ω), add a starting item with lookahead F.

A state is a set of items. For example, {[pets→pets pet •, <<c>>], [pets→pets pet •, <<d>>], [pets→pets pet •, –]} is state s2 in the pets grammar.

Each item has a time out. If an item is complete, then its time out is the same as the time out of its rule. A nonempty rule or a lambda-rule has an infinite time out.) If an item is not complete, then its time out is infinite.

Each state has also time out, which is equal to the smallest time out among its items.

Closure. A state is a set of items, but not every set of items is state. To be a state, the set must be a complete closure. The closure function produces a complete state from an initial set of items by adding the items necessary to complete it.

If J is a set of items, then compute Closure(J) like this:

1. Start with a list of items todo, which initially contains all the items in J, and a set of items done, which is initially empty.

2. If todo is empty, return done as a state of the grammar.

3. Pop one item from todo. If item is already in done or if item is complete (that it, if it has its dot on the far right), discard item and go back to step 2.

4. Let B be the corner symbol of item, let β be the beta sequence of item, let X be the lookahead of item, and let next be the set of events First(βX).

5. Add the break event to next.

6. For each rule in which B appears as the left-hand side, and for each event Y in next, add the item [rule, 0, Y] to todo.

7. Go back to step 2.

Goto. A state contains the set of items that are viable for some sequence γ and every sequence has a state which represents it in this way. Therefore, the sequence γX, which is identical to γ but is one event longer, must also be represented by a state. If the state of γ is J, then the state of γX is called the goto of J with X.

To compute Goto(J, X):

1. Start with a list of items todo, which initially contains all the items in J, and a set of items next, which is initially empty.

2. If todo is empty, return Closure(next) as the goto state.

3. Pop one item from todo. If item is complete or if the corner symbol of item is not X, discard item and go back to step 2.

4. Let rule by the rule of item and dot be the dot position of item, and Y be the lookahead of item. Add the item [rule, dot+1, Y] to next.

5. Go back to step 2.

Construction Algorithm. We can now explain the three steps of the construction algorithm mentioned at the beginning of this chapter. The first step, computing the first and follow sets, is simply a matter of iterating through all the symbols and applying the definitions from the previous section. We explain the second and third steps now.

State Generation. To generate all the states of a grammar:

1. Start with a list of states, todo, which initially contains the closure of the starting items, and a set of states done, which is initially empty.

2. If todo is empty, return done as the set of states of the grammar.

3. Pop one state, J, from todo. If J is already in done, discard it and go back to step 2.

4. For each symbol, X, in the grammar (including Ω and break), let K be Goto(J, X). If K is nonempty, add K to todo.

5. Go back to step 2.

Table E shows the result of applying this algorithm to the grammar in Table B.

TABLE E

Items of the States of "pets"

| State | Items |
|---|---|
| s0 | [Ω → • pets, «c»] |
|  | [Ω → • pets, «d»] |
|  | [Ω → • pets, —] |
|  | [pets → τ50, «c»] |
|  | [pets → τ50, «d»] |
|  | [pets → τ50, —] |
|  | [pets → • pets pet, «c»] |
|  | [pets → • pets pet, «d»] |
|  | [pets → • pets pet, —] |
| s1 | [Ω → pets •, «c»] |
|  | [Ω → pets •, «d»] |
|  | [Ω → pets •, —] |
|  | [pet → • «c»«a»«n»«a»«r»«y», «c»] |
|  | [pet → • «c»«a»«n»«a»«r»«y», «d»] |
|  | [pet → • «c»«a»«n»«a»«r»«y», —] |
|  | [pet → • «c»«a»«t», «c»] |
|  | [pet → • «c»«a»«t», «d»] |
|  | [pet → • «c»«a»«t», —] |
|  | [pet → • «d»«o»«g», «c»] |
|  | [pet → • «d»«o»«g», «d»] |
|  | [pet → • «d»«o»«g», —] |
|  | [pets → pets • pet, «c»] |
|  | [pets → pets • pet, «d»] |
|  | [pets → pets • pet, —] |
| s2 | [pets → pets pet •, «c»] |
|  | [pets → pets pet •, «d»] |
|  | [pets → pets pet •, —] |
| s3 | [pet → «c» • «a»«n»«a»«r»«y», «c»] |
|  | [pet → «c» • «a»«n»«a»«r»«y», «d»] |
|  | [pet → «c» • «a»«n»«a»«r»«y», —] |
|  | [pet → «c» • «a»«t», «c»] |
|  | [pet → «c» • «a»«t», «d»] |
|  | [pet → «c» • «a»«t», —] |
| s4 | [pet → «d» • «o»«g», «c»] |
|  | [pet → «d» • «o»«g», «d»] |
|  | [pet → «d» • «o»«g», —] |
| s5 | [pet → «c»«a» • «n»«a»«r»«y», «c»] |
|  | [pet → «c»«a» • «n»«a»«r»«y», «d»] |
|  | [pet → «c»«a» • «n»«a»«r»«y», —] |
|  | [pet → «c»«a» • «t», «c»] |
|  | [pet → «c»«a» • «t», «d»] |
|  | [pet → «c»«a» • «t», —] |
| s6 | [pet → «d»«o» • «g», «c»] |
|  | [pet → «d»«o» • «g», «d»] |
|  | [pet → «d»«o» • «g», —] |
| s7 | [pet → «c»«a»«n» • «a»«r»«y», «c»] |
|  | [pet → «c»«a»«n» • «a»«r»«y», «d»] |
|  | [pet → «c»«a»«n» • «a»«r»«y», —] |
| s8 | [pet → «c»«a»«t» •, «c»] |
|  | [pet → «c»«a»«t» •, «d»] |
|  | [pet → «c»«a»«t» •, —] |
| s9 | [pet → «d»«o»«g» •, «c»] |
|  | [pet → «d»«o»«g» •, «d»] |
|  | [pet → «d»«o»«g» •, —] |
| s10 | [pet → «c»«a»«n»«a» • «r»«y», «c»] |
|  | [pet → «c»«a»«n»«a» • «r»«y», «d»] |
|  | [pet → «c»«a»«n»«a» • «r»«y», —] |
| s11 | [pet → «c»«a»«n»«a»«r» • «y», «c»] |
|  | [pet → «c»«a»«n»«a»«r» • «y», «d»] |
|  | [pet → «c»«a»«n»«a»«r» • «y», —] |
| s12 | [pet → «c»«a»«n»«a»«r»«y» •, «c»] |
|  | [pet → «c»«a»«n»«a»«r»«y» •, «d»] |
|  | [pet → «c»«a»«n»«a»«r»«y» •, —] |

Table Generation. After the states have been generated, each state is converted to a row in the parser table. Each row consists of two parts: the actions and the transitions.

To compute the actions of a state, J:

For each item in J, let rule be the rule of item, let B be the corner symbol of item (if it has one), and let X be the lookahead of item:

a. If item is complete and its left-hand side is Ω, action(J, X) is restart.

b. If item is complete and its left-hand side is not Ω, action(J, X) is reduce(rule).

c. If item is not complete and B is a token and Goto(J, B) is not empty, action(J, X) is shift(Goto(J, B)).

d. In all other cases action(J, X) is panic.

To compute the transitions of a state, J:

For each reduction, A, in the grammar, let K be Goto(J, A):

a. If K is nonempty, transition(J, A) is K.

b. If K is empty, transition(J, A) is undefined.

Applying these algorithms to table E produces table B.

Additional Optimizations. As noted earlier, this algorithm for construction of a TFR(1) parser table is similar to and an extension of the algorithm for constructing canonical LR(1) parser tables. The various generalizations, optimizations, and state-reduction strategies which are applied to LR(1) parsers may also be applied, mutatis mutandis, to TFR(1) parser tables. Such strategies include but are not limited to the optimization of LR(1) to LALR(1) and the generalization of LR(1) to GLR(1).

A method for describing and translating reactive functions for use data flow computing environments, includes: (1) Identifying a reactive function. (2) Identifying the pattern of parameters providing inputs to the function. (3) Identifying the expression to be evaluated based on the arguments passed to the function. (4) Translating the pattern of parameters into a state machine capable of recognizing the sequences of input which match the pattern. (5) Augmenting the state machine with the ability to invoke the functions transform input data into output data. (6) Implementing the state machine as a deterministic pushdown automaton capable of automation by simple software or hardware.

In an implementation, a method includes: receiving a data stream from a hardware sensor that monitors a physical quantity and transforms the monitored physical quantity into the data stream in digital form; storing the data stream in an input queue, where each token in the data stream is stored along with a time stamp of when the token is received; identifying patterns in the data stream that match one or more predetermined patterns by reading tokens through the input queue in a single direction, and not rereading any previously read tokens; and upon identifying a predetermined pattern in the data stream, outputting a positive indication in the output queue that the predetermined pattern has been identified.

The method can further include while a predetermined pattern is not identified in the data stream, outputting a negative indication in an output queue that the predetermined pattern has been identified, where the predetermined patterns are stored in a state table and state stack.

In another implementation, a system includes: An input queue comprising first memory locations in a computer memory, where the input queue stores in the first memory locations a first-in, first-out sequence of tokens to be processed and a time stamp associated with each token in the queue indicates a time when the associated token entered the input queue, and the tokens are received by the input queue over a network. A driver component, connected to the input queue, where the driver component processes the tokens in the input queue without backtracking and identifies patterns in the sequence of tokens that match one or more predetermined input patterns, and upon identifying a matched predetermined input pattern, generates an outgoing event output; An output queue, connected to the driver component, including second memory locations in the computer memory, where the output queue stores in the second memory locations a first-in, first-out sequence of the outgoing events generated by the driver component. A state table component, connected to the driver component, where the state table component stores the predetermined input patterns in a state table format. A state stack component, connected to the driver component, including third memory locations in the computer memory, where the state stack component stores in the third memory locations a last-in, first-out sequential storage of frames. A frame includes a translation state number, a symbol, and a deadline.

The tokens are received at the input queue can be generated by a hardware sensor that transforms a physical property into a digital quantity. An operation of the driver component can include: examining a state referred to on a top frame of the state stack, examining a next input token in the input queue and determining its category based on the state stack, and performing an action indicated by the state table for a token of a category as indicated by the state table.

The input queue stores the tokens in an ordered list based on a time received by the input queue. A first direction in the queue is a time order from an earliest received token to a latest received token. The driver component processes the tokens by examining the input queue in the first direction, and does not examine any previously examined token or tokens.

The input queue stores the tokens in a list in a time order as received by the input queue. A first direction in the queue is a time order from an earliest received token to a latest received token. A second direction in the queue is a time order from the latest received token to the earliest received token. The second direction is opposite to the first direction. The driver component processes the tokens by examining the input queue in only either the first direction or the second direction, not both first and second directions.

The driver reads each token of the input queue only once, and does not retain a read token in a buffer to read again later. A predetermined input pattern to be matched can have a number of tokens of indefinite length. The state table component specifies a state machine and includes a number of rows, each row providing a translation state of the state machine.

Each row includes: a set of actions, which maps an input token category value or an input break category value to an action to be taken upon receiving an input token of that value; a set of transitions, which maps a derivative symbol type to a state to which the driver should change upon synthesizing a derivative symbol of that type; and a time out, which indicates an interval of time that the state machine will be allowed to remain in a particular state.

The translation state number is a reference to a row in the state table. The symbol is a token or intermediate symbol derived from input tokens or other symbols, or a combination. The deadline is a future moment in time by which the driver will pop the frame off the stack.

In an implementation, the driver component and state table component are embodied in a programmable gate array. In another implementation, the driver component and state table component are embodied using a computer. The state table component specifies a state machine, and the driver component changes from a first state in the state machine to a second state of the state machine based on a passage of time where no tokens having stream data are received in the input queue.

The state table component specifies a state machine. The driver component changes from a first state in the state machine to a second state of the state machine based on a sequence of tokens having stream data received in the input queue during a first time period. The driver component changes from a third state in the state machine to a fourth state of the state machine based a sequence of tokens having stream data not being received in the input queue during a second time period.

In another implementation, a method includes: Providing an input queue including first memory locations in a computer memory, where the input queue stores in the first memory locations a first-in, first-out sequence of tokens to be processed and a time stamp associated with each token in the queue indicates a time when the associated token entered the input queue, and the tokens are received by the input queue over a network. Providing driver component, connected to the input queue, where the driver component processes the tokens in the input queue without backtracking and identifies patterns in the sequence of tokens that match one or more predetermined input patterns, and upon identifying a matched predetermined input pattern, generates an outgoing event output. Providing an output queue, connected to the driver component, including second memory locations in the computer memory, where the output queue stores in the second memory locations a first-in, first-out sequence of the outgoing events generated by the driver component. Providing a state table component, connected to the driver component, where the state table component stores the predetermined input patterns in a state table format. Providing a state stack component, connected to the driver component, including third memory locations in the computer memory, where the state stack component stores in the third memory locations a last-in, first-out sequential storage of frames, and a frame comprises a translation state number, a symbol, and a deadline.

Generating a state table for the state table component includes: identifying a set of terminal symbols, wherein each symbol represents a category of input data; identifying a set of nonterminal symbols, wherein each nonterminal symbol represents a pattern of at least one of terminal or nonterminal symbols; identifying a set of grammar rules; identifying a top-level rule; identifying a set of attributes; computing a first set for each identified terminal and nonterminal symbol; computing a follow set for each identified terminal and nonterminal symbol; and generating a starting state from a closure of the top-level rule with each of the members of a corresponding follow set.

The generating the state table can include: generating all states reachable from the starting state by recursively generating a closure of each state for which a change-in-state transition exists from the starting state; optimizing the set of states by combination and reduction; and generating the action, transition, and time out values for each state.

The set of grammar rules can include: each nonempty rule takes the form of A→B0 . . . Bn, where A is a nonterminal symbol and B0 through Bn are each either terminal or nonterminal symbols; and each empty rule takes a form A→τ, where τ is either a finite amount of time, characterized in some useful unit of time, or else is infinity, indicating an unlimited amount of time.

The set of attributes can include comprises: each attribute takes a form α:T={A0→λ0, . . . An→λn}, wherein α is a name of the attribute, T is the type of the attribute, A is a nonterminal symbol, and λ is a function which is to be used to compute a value of the attribute for that symbol. A top-level rule can have form Ω→B, where B is either a terminal or nonterminal symbol.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
an input queue comprising first memory locations in a computer memory, wherein the input queue stores in the first memory locations a first-in, first-out sequence of tokens to be processed where each token in the queue comprises data or no data and a time stamp indicating a time when the token entered the input queue, each token comprising data carries data to be analyzed and a time stamp, each token comprising no data represents a lapse event and carries no data to be analyzed and a time stamp, and the tokens are received by the input queue over a network;
a driver component, coupled to the input queue, wherein the driver component processes the tokens in the input queue without backtracking and identifies patterns in the sequence of tokens that match one or more predetermined input patterns, and upon identifying a matched predetermined input pattern, generates an outgoing event output;
an output queue, coupled to the driver component, comprising second memory locations in the computer memory, wherein the output queue stores in the second memory locations a first-in, first-out sequence of the outgoing events generated by the driver component;
a state table component, coupled to the driver component, wherein the state table component stores the predetermined input patterns in a state table format comprising rows, and each row represents a state of a plurality of states described by the state table component; and
a state stack component, coupled to the driver component, comprising third memory locations in the computer memory, wherein the state stack component stores in the third memory locations a last-in, first-out sequential storage of frames, and a frame comprises a translation state number, a symbol, and a deadline, and the translation state number corresponds to a state described by the state table component.

2. The system of claim 1 wherein the tokens are received at the input queue are generated by a hardware sensor that transforms a physical property into a digital quantity.

3. The system of claim 1 wherein an operation of the driver component comprises:
examining a state referred to on a top frame of the state stack,
examining a next input token in the input queue and determining its category based on the state stack, and
performing an action indicated by the state table for a token of a category as indicated by the state table.

4. The system of claim 1 wherein the input queue stores the tokens in an ordered list based on a time received by the input queue, and a first direction in the queue is a time order from an earliest received token to a latest received token, and
the driver component processes the tokens by examining the input queue in the first direction, and does not examine any previously examined token.

5. The system of claim 1 wherein the input queue stores the tokens in a list in a time order as received by the input queue, a first direction in the queue is a time order from an earliest received token to a latest received token, a second direction in the queue is a time order from the latest received token to the earliest received token, and the second direction is opposite to the first direction, and the driver component processes the tokens by examining the input queue in either the first direction or the second direction, and not both first and second directions.

6. The system of claim 1 wherein the driver reads each token of the input queue only once, and does not retain a read token in a buffer to read again later.

7. The system of claim 1 wherein a predetermined input pattern to be matched can have a number of tokens of indefinite length.

8. The system of claim 1 wherein the state table component specifies a state machine and comprises a plurality of rows, each row providing a translation state of the state machine comprising:

a set of actions, which maps an input token category value or an input break category value to an action to be taken upon receiving an input token of that value, a set of transitions, which maps a derivative symbol type to a state to which the driver should change upon synthesizing a derivative symbol of that type, and a time out, which indicates an interval of time that the state machine will be allowed to remain in a particular state.

9. The system of claim 1 wherein the translation state number is a reference to a row in the state table, the symbol is a token or intermediate symbol derived from input tokens or other symbols, or a combination, and the deadline is a future moment in time by which the driver will pop the frame off the stack.

10. The system of claim 1 wherein the driver component and state table component are embodied in a programmable gate array.

11. The system of claim 1 wherein the driver component and state table component are embodied using a computer.

12. The system of claim 1 wherein the state table component specifies a state machine, and the driver component changes from a first state in the state machine to a second state of the state machine based on a passage of time where no tokens having stream data are received in the input queue.

13. The system of claim 1 wherein the state table component specifies a state machine, and the driver component changes from a first state in the state machine to a second state of the state machine based on a sequence of tokens having stream data received in the input queue during a first time period, and the driver component changes from a third state in the state machine to a fourth state of the state machine based on a sequence of tokens having stream data not being received in the input queue during a second time period.

14. The system of claim 1 wherein upon the occurrence of a lapse event, the driver component allows a current state to expire.

15. A method comprising:

providing an input queue comprising first memory locations in a computer memory, wherein the input queue stores in the first memory locations a first-in, first-out sequence of tokens to be processed and a time stamp associated with each token in the queue indicates a time when the associated token entered the input queue, and the tokens are received by the input queue over a network;

providing a driver component, coupled to the input queue, wherein the driver component processes the tokens in the input queue without backtracking and identifies patterns in the sequence of tokens that match one or more predetermined input patterns, and upon identifying a matched predetermined input pattern, generates an outgoing event output;

providing an output queue, coupled to the driver component, comprising second memory locations in the computer memory, wherein the output queue stores in the second memory locations a first-in, first-out sequence of the outgoing events generated by the driver component;

providing a state table component, coupled to the driver component, wherein the state table component stores the predetermined input patterns in a state table format;

providing a state stack component, coupled to the driver component, comprising third memory locations in the computer memory, wherein the state stack component stores in the third memory locations a last-in, first-out sequential storage of frames, and a frame comprises a translation state number, a symbol, and a deadline, and the translation state number corresponds to a state described by the state table component; and generating a state table for the state table component comprising:

identifying a set of terminal symbols, wherein each symbol represents a category of input data;

identifying a set of nonterminal symbols, wherein each nonterminal symbol represents a pattern of at least one of terminal or nonterminal symbols;

identifying a set of grammar rules;

identifying a top-level rule;

identifying a set of attributes;

computing a first set for each identified terminal and nonterminal symbol;

computing a follow set for each identified terminal and nonterminal symbol; and generating a starting state from a closure of the top-level rule with each member of a corresponding follow set, wherein the generating the state table comprises:

generating all states reachable from the starting state by recursively generating a closure of each state for which a change-in-state transition exists from the starting state;

optimizing the set of states by combination and reduction; and generating action, transition, and time out values for each state; and wherein the set of attributes comprises:

each attribute takes a form $\alpha:T=\{A0\rightarrow\lambda 0 \ldots An\rightarrow\lambda n\}$, wherein $\alpha$ is a name of the attribute, T is the type of the attribute, A is a nonterminal symbol, and $\lambda$, is a function which is to be used to compute a value of the attribute for that symbol.

16. The method of claim 15 wherein a top-level rule has a form comprising $\Omega\rightarrow B$, where B is either a terminal or nonterminal symbol.

17. A method comprising:

providing an input queue comprising first memory locations in a computer memory, wherein the input queue stores in the first memory locations a first-in, first-out sequence of tokens to be processed and a time stamp associated with each token in the queue indicates a time when the associated token entered the input queue, and the tokens are received by the input queue over a network;

providing a driver component, coupled to the input queue, wherein the driver component processes the tokens in the input queue without backtracking and identifies patterns in the sequence of tokens that match one or more predetermined input patterns, and upon identifying a matched predetermined input pattern, generates an outgoing event output;

providing an output queue, coupled to the driver component, comprising second memory locations in the computer memory, wherein the output queue stores in the second memory locations a first-in, first-out sequence of the outgoing events generated by the driver component;

providing a state table component, coupled to the driver component, wherein the state table component stores the predetermined input patterns in a state table format;

providing a state stack component, coupled to the driver component, comprising third memory locations in the computer memory, wherein the state stack component stores in the third memory locations a last-in, first-out sequential storage of frames, and a frame comprises a translation state number, a symbol, and a deadline, and the translation state number corresponds to a state described by the state table component; and generating a state table for the state table component comprising:

identifying a set of terminal symbols, wherein each symbol represents a category of input data;

identifying a set of nonterminal symbols, wherein each nonterminal symbol represents a pattern of at least one of terminal or nonterminal symbols;

identifying a set of grammar rules;

identifying a top-level rule;

identifying a set of attributes;

computing a first set for each identified terminal and nonterminal symbol;

computing a follow set for each identified terminal and nonterminal symbol; and generating a starting state from a closure of the top-level rule with each member of a corresponding follow set, wherein the generating the state table comprises:

generating all states reachable from the starting state by recursively generating a closure of each state for which a change-in-state transition exists from the starting state;

optimizing the set of states by combination and reduction; and generating action, transition, and time out values for each state; and wherein the set of grammar rules comprises:

each nonempty rule takes the form of A→B0 . . . Bn, where A is a nonterminal symbol and B0 through Bn are each either terminal or nonterminal symbols; and each empty rule takes a form A→τ, where τ is either a finite amount of time, characterized in some useful unit of time, or else is infinity, indicating an unlimited amount of time.

18. The method of claim 17 wherein the set of attributes comprises:

each attribute takes a form α:T={A0→λ0 . . . An→λn}, wherein α is a name of the attribute, T is the type of the attribute, A is a nonterminal symbol, and λ is a function which is to be used to compute a value of the attribute for that symbol.

19. A method comprising:

providing an input queue comprising first memory locations in a computer memory, wherein the input queue stores in the first memory locations a first-in, first-out sequence of tokens to be processed and a time stamp associated with each token in the queue indicates a time when the associated token entered the input queue, and the tokens are received by the input queue over a network;

providing a driver component, coupled to the input queue, wherein the driver component processes the tokens in the input queue without backtracking and identifies patterns in the sequence of tokens that match one or more predetermined input patterns, and upon identifying a matched predetermined input pattern, generates an outgoing event output;

providing an output queue, coupled to the driver component, comprising second memory locations in the computer memory, wherein the output queue stores in the second memory locations a first-in, first-out sequence of the outgoing events generated by the driver component;

providing a state table component, coupled to the driver component, wherein the state table component stores the predetermined input patterns in a state table format;

providing a state stack component, coupled to the driver component, comprising third memory locations in the computer memory, wherein the state stack component stores in the third memory locations a last-in, first-out sequential storage of frames, and a frame comprises a translation state number, a symbol, and a deadline, and the translation state number corresponds to a state described by the state table component; and generating a state table for the state table component comprising:

identifying a set of terminal symbols, wherein each symbol represents a category of input data;

identifying a set of nonterminal symbols, wherein each nonterminal symbol represents a pattern of at least one of terminal or nonterminal symbols;

identifying a set of grammar rules;

identifying a top-level rule;

identifying a set of attributes;

computing a first set for each identified terminal and nonterminal symbol;

computing a follow set for each identified terminal and nonterminal symbol; and generating a starting state from a closure of the top-level rule with each member of a corresponding follow set, wherein the set of grammar rules comprises:

each nonempty rule takes the form of A→B0 . . . Bn, where A is a nonterminal symbol and B0 through Bn are each either terminal or nonterminal symbols; and each empty rule takes a form A→τ, where τ is either a finite amount of time, characterized in some useful unit of time, or else is infinity, indicating an unlimited amount of time.

20. The method of claim 19 wherein the set of attributes comprises:

each attribute takes a form α:T={A0→λ0 . . . An→λn}, wherein α is a name of the attribute, T is the type of the attribute, A is a nonterminal symbol, and λ is a function which is to be used to compute a value of the attribute for that symbol.

21. A method comprising:

providing an input queue comprising first memory locations in a computer memory, wherein the input queue stores in the first memory locations a first-in, first-out sequence of tokens to be processed and a time stamp associated with each token in the queue indicates a time when the associated token entered the input queue, and the tokens are received by the input queue over a network;

providing a driver component, coupled to the input queue, wherein the driver component processes the tokens in the input queue without backtracking and identifies patterns in the sequence of tokens that match one or more predetermined input patterns, and upon identifying a matched predetermined input pattern, generates an outgoing event output;

providing an output queue, coupled to the driver component, comprising second memory locations in the computer memory, wherein the output queue stores in the second memory locations a first-in, first-out sequence of the outgoing events generated by the driver component;

providing a state table component, coupled to the driver component, wherein the state table component stores the predetermined input patterns in a state table format;

providing a state stack component, coupled to the driver component, comprising third memory locations in the computer memory, wherein the state stack component stores in the third memory locations a last-in, first-out sequential storage of frames, and a frame comprises a translation state number, a symbol, and a deadline, and the translation state number corresponds to a state described by the state table component; and generating a state table for the state table component comprising:

identifying a set of terminal symbols, wherein each symbol represents a category of input data;

identifying a set of nonterminal symbols, wherein each nonterminal symbol represents a pattern of at least one of terminal or nonterminal symbols;

identifying a set of grammar rules;

identifying a top-level rule;

identifying a set of attributes;

computing a first set for each identified terminal and nonterminal symbol;

computing a follow set for each identified terminal and nonterminal symbol; and generating a starting state from a closure of the top-level rule with each member of a corresponding follow set, wherein the set of attributes comprises:

each attribute takes a form $\alpha:T=\{A0 \to \lambda 0 \to \ldots An \to \lambda n\}$, wherein $\alpha$ is a name of the attribute, T is the type of the attribute, A is a nonterminal symbol, and $\lambda$ is a function which is to be used to compute a value of the attribute for that symbol.

22. A system comprising:

an input queue comprising first memory locations in a computer memory, wherein the input queue stores in the first memory locations a first-in, first-out sequence of tokens to be processed where each token in the queue comprises data or no data and a time stamp indicating a time when the token entered the input queue, each token comprising data carries data to be analyzed and a time stamp, each token comprising no data represents a lapse event and carries no data to be analyzed and a time stamp, and the tokens are received by the input queue over a network;

a driver component, coupled to the input queue, wherein the driver component processes the tokens in the input queue and identifies patterns in the sequence of tokens that match one or more predetermined input patterns, and upon identifying a matched predetermined input pattern, generates an outgoing event output;

an output queue, coupled to the driver component, comprising second memory locations in the computer memory, wherein the output queue stores in the second memory locations a first-in, first-out sequence of the outgoing events generated by the driver component;

a state table component, coupled to the driver component, wherein the state table component stores the predetermined input patterns in a state table format comprising rows, and each row represents a state of a plurality of states described by the state table component; and a state stack component, coupled to the driver component, comprising third memory locations in the computer memory, wherein the state stack component stores in the third memory locations a last-in, first-out sequential storage of frames, and a frame comprises a translation state number, a symbol, and a deadline, and the translation state number corresponds to a state described by the state table component.

23. The system of claim 22 wherein the state table component specifies a state machine, and the driver component changes from a first state in the state machine to a second state of the state machine based on a sequence of tokens having stream data received in the input queue during a first time period.

24. The system of claim 22 wherein the state table component specifies a state machine, and the driver component changes from a first state in the state machine to a second state of the state machine based on a sequence of tokens having stream data not being received in the input queue during a first time period.

* * * * *